United States Patent
Alano

(10) Patent No.: US 9,726,064 B2
(45) Date of Patent: Aug. 8, 2017

(54) MIXER FOR USE IN A VEHICLE EXHAUST SYSTEM

(71) Applicant: Faurecia Emissions Control Technologies, USA, LLC, Columbus, IN (US)

(72) Inventor: Eduardo Alano, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 15/132,464

(22) Filed: Apr. 19, 2016

(65) Prior Publication Data
US 2016/0317986 A1   Nov. 3, 2016

Related U.S. Application Data

(63) Continuation-in-part of application No. 14/737,533, filed on Jun. 12, 2015.
(Continued)

(51) Int. Cl.
*F01N 1/00* (2006.01)
*F01N 3/20* (2006.01)
(Continued)

(52) U.S. Cl.
CPC ........... *F01N 3/2066* (2013.01); *B01D 53/94* (2013.01); *B01F 3/04021* (2013.01);
(Continued)

(58) Field of Classification Search
CPC ... F01N 3/2066; F01N 3/021; B01D 53/9431; B01D 53/94; B10D 2257/404; B01F 3/04021; B01F 5/0608
(Continued)

(56) References Cited

U.S. PATENT DOCUMENTS

| 1,462,219 A | 7/1923 | Wagner |
| 3,524,631 A | 8/1970 | Mare |

(Continued)

FOREIGN PATENT DOCUMENTS

| CN | 1370092 | 8/1999 |
| CN | 1448620 | 3/2002 |

(Continued)

OTHER PUBLICATIONS

International Search Report for PCT International Application Serial No. PCT/US2016/058114, 16FECT013 PCT II, 9 pages.
(Continued)

*Primary Examiner* — Jason Shanske
(74) *Attorney, Agent, or Firm* — Barnes & Thornburg LLP

(57) ABSTRACT

A mixer for a vehicle exhaust system includes a mixer body defining a mixer central axis and having an inlet configured to receive engine exhaust gas and an outlet. The mixer further includes an upstream baffle positioned within the mixer body and a downstream baffle positioned within the mixer body to be spaced from the upstream baffle in a direction along the mixer central axis. A doser defines a doser axis and is positioned to spray a reducing agent into an area between the upstream baffle and the downstream baffle such that a mixture of reducing agent and exhaust gas exits the outlet. The mixture moves through a rotational flow path that is at least 360 degrees before exiting the outlet.

21 Claims, 17 Drawing Sheets

Related U.S. Application Data

(60) Provisional application No. 62/155,007, filed on Apr. 30, 2015.

(51) Int. Cl.

| | | |
|---|---|---|
| *B01F 3/04* | (2006.01) | |
| *B01D 53/94* | (2006.01) | |
| *F01N 3/021* | (2006.01) | |
| *B01F 5/00* | (2006.01) | |
| *B01F 5/04* | (2006.01) | |
| *B01F 5/06* | (2006.01) | |

(52) U.S. Cl.
CPC .......... *B01F 5/0065* (2013.01); *B01F 5/0473* (2013.01); *B01F 5/0608* (2013.01); *F01N 3/021* (2013.01)

(58) Field of Classification Search
USPC .......................................................... 60/324
See application file for complete search history.

(56) References Cited

U.S. PATENT DOCUMENTS

| | | |
|---|---|---|
| 4,094,934 A | 6/1978 | Tuckey |
| 4,538,413 A | 9/1985 | Shinzawa |
| 4,576,617 A | 3/1986 | Renevot |
| 5,605,042 A | 2/1997 | Stutzenberger |
| 5,606,856 A | 3/1997 | Linder |
| 5,648,022 A | 7/1997 | Gohara |
| 5,826,428 A | 10/1998 | Blaschke |
| 6,192,677 B1 | 2/2001 | Tost |
| 6,460,340 B1 | 10/2002 | Chauvette |
| 6,513,323 B1 | 2/2003 | Weigl |
| 6,516,610 B2 | 2/2003 | Hodgson |
| 6,539,708 B1 | 4/2003 | Hofmann |
| 6,637,196 B1 | 10/2003 | Tost |
| 6,722,123 B2 | 4/2004 | Liu |
| 6,755,014 B2 | 6/2004 | Kawai |
| 7,448,206 B2 | 11/2008 | Meingast |
| 7,784,273 B2 | 8/2010 | Kanaya |
| 7,992,379 B2 | 8/2011 | Suzuki |
| 8,033,101 B2 | 10/2011 | Amon |
| 8,079,211 B2 | 12/2011 | Levin |
| 8,173,088 B2 | 5/2012 | Makartchouk |
| 8,216,537 B2 | 7/2012 | Kouvetakis |
| 8,438,839 B2 | 5/2013 | Floyd |
| 8,607,550 B2 | 12/2013 | Tangemann |
| 8,622,316 B2 | 1/2014 | Haeberer |
| 8,726,643 B2 | 5/2014 | Way |
| 8,756,921 B2 | 6/2014 | Troxler et al. |
| 8,800,276 B2 | 8/2014 | Levin |
| 8,916,100 B2 | 12/2014 | Iijima |
| 8,932,530 B2 | 1/2015 | Iijima |
| 9,003,775 B2 | 4/2015 | Wright |
| 9,180,407 B2 | 11/2015 | De Rudder |
| 9,188,039 B2 | 11/2015 | Nagel |
| 9,266,075 B2 | 2/2016 | Chapman |
| 9,308,495 B2 | 4/2016 | Kimura |
| 2002/0108368 A1 | 8/2002 | Hodgson |
| 2003/0079467 A1 | 5/2003 | Liu |
| 2003/0110763 A1 | 6/2003 | Pawson |
| 2003/0182935 A1 | 10/2003 | Kawai |
| 2003/0226412 A1 | 12/2003 | Rumminger |
| 2006/0070374 A1 | 4/2006 | Gaiser |
| 2006/0218902 A1 | 10/2006 | Arellano |
| 2007/0092413 A1 | 4/2007 | Hirata |
| 2007/0163241 A1 | 7/2007 | Meingast |
| 2007/0193252 A1 | 8/2007 | McKinley |
| 2008/0011777 A1 | 1/2008 | Cooke |
| 2008/0011780 A1 | 1/2008 | Cooke |
| 2008/0022663 A1 | 1/2008 | Dodge |
| 2008/0022670 A1 | 1/2008 | Ichikawa |
| 2008/0092526 A1 | 4/2008 | Kunkel |
| 2008/0163612 A1 | 7/2008 | Gaiser |
| 2008/0223022 A1 | 9/2008 | Amon |
| 2008/0256931 A1 | 10/2008 | Kawakita |
| 2008/0282687 A1 | 11/2008 | Park |
| 2008/0295497 A1 | 12/2008 | Kornherr |
| 2009/0019837 A1 | 1/2009 | Suzuki |
| 2009/0019842 A1 | 1/2009 | Suzuki |
| 2009/0019843 A1 | 1/2009 | Levin |
| 2009/0044524 A1 | 2/2009 | Fujino |
| 2009/0084094 A1 | 4/2009 | Goss |
| 2009/0107126 A1 | 4/2009 | Bugos et al. |
| 2009/0120066 A1 | 5/2009 | VanderGriend |
| 2009/0127511 A1 | 5/2009 | Bruck |
| 2009/0158717 A1 | 6/2009 | Kimura |
| 2010/0005790 A1 | 1/2010 | Zhang |
| 2010/0005791 A1 | 1/2010 | Ranganathan |
| 2010/0071355 A1 | 3/2010 | Brown |
| 2010/0083643 A1 | 4/2010 | Hayashi |
| 2010/0101222 A1 | 4/2010 | Oesterle |
| 2010/0107614 A1 | 5/2010 | Levin |
| 2010/0186393 A1 | 7/2010 | Kowada |
| 2010/0196225 A1 | 8/2010 | Harinath |
| 2010/0212292 A1 | 8/2010 | Rusch et al. |
| 2010/0263359 A1 | 10/2010 | Haverkamp |
| 2011/0036082 A1 | 2/2011 | Collinot |
| 2011/0061374 A1 | 3/2011 | Noritake |
| 2011/0079003 A1 | 4/2011 | Sun |
| 2011/0088376 A1 | 4/2011 | Kowada |
| 2011/0094206 A1 | 4/2011 | Liu |
| 2011/0107743 A1 | 5/2011 | Ranganathan |
| 2011/0113759 A1 | 5/2011 | Tilinski |
| 2011/0113764 A1* | 5/2011 | Salanta ................ F01N 3/2066 60/303 |
| 2011/0126529 A1 | 6/2011 | Park |
| 2011/0274590 A1 | 11/2011 | Floyd |
| 2011/0308234 A1 | 12/2011 | De Rudder |
| 2012/0020854 A1 | 1/2012 | Makartchouk |
| 2012/0090305 A1 | 4/2012 | Floyd |
| 2012/0174561 A1 | 7/2012 | Troxler |
| 2012/0216513 A1 | 8/2012 | Greber et al. |
| 2012/0324872 A1 | 12/2012 | Jaruvatee |
| 2013/0061577 A1 | 3/2013 | Floyd |
| 2013/0152558 A1 | 6/2013 | Loman |
| 2013/0164182 A1 | 6/2013 | Iijima |
| 2013/0167516 A1 | 7/2013 | Loman |
| 2013/0174537 A1 | 7/2013 | Loman |
| 2013/0216442 A1 | 8/2013 | Brunel et al. |
| 2013/0239546 A1 | 9/2013 | Levin |
| 2013/0269325 A1 | 10/2013 | Hadden |
| 2014/0044603 A1 | 2/2014 | Greber |
| 2014/0079599 A1 | 3/2014 | Hill |
| 2014/0196440 A1 | 7/2014 | Katou |
| 2014/0196441 A1 | 7/2014 | Katou |
| 2014/0196442 A1 | 7/2014 | Katou |
| 2014/0196444 A1 | 7/2014 | Watahiki |
| 2014/0311133 A1 | 10/2014 | Norling |
| 2014/0318112 A1 | 10/2014 | Solbrig et al. |
| 2014/0334987 A1 | 11/2014 | Stanavich |
| 2014/0334988 A1 | 11/2014 | Stanavich |
| 2015/0040537 A1 | 2/2015 | Hicks |
| 2015/0047329 A1 | 2/2015 | Way |
| 2015/0071826 A1 | 3/2015 | Sampath |
| 2015/0101313 A1 | 4/2015 | Mitchell |
| 2015/0101318 A1 | 4/2015 | Munnannur |
| 2015/0135683 A1 | 5/2015 | Petry |
| 2015/0152766 A1 | 6/2015 | Brunel |
| 2015/0167525 A1 | 6/2015 | Assalve |
| 2015/0290585 A1 | 10/2015 | Nagata |
| 2015/0361853 A1 | 12/2015 | Nagata |
| 2016/0032808 A1 | 2/2016 | Kobe |
| 2016/0184783 A1 | 6/2016 | Tyni |

FOREIGN PATENT DOCUMENTS

| | | |
|---|---|---|
| DE | 19856366 C1 | 4/2000 |
| DE | 4417238 | 3/2003 |
| DE | 19806265 | 7/2004 |
| DE | 10248294 | 10/2005 |
| DE | 10306134 | 5/2006 |
| DE | 10312212 | 9/2006 |

(56) References Cited

FOREIGN PATENT DOCUMENTS

| | | |
|---|---|---|
| DE | 102006003786 | 4/2007 |
| DE | 102005061145 | 6/2007 |
| DE | 102005061145 A1 | 6/2007 |
| DE | 202007010324 | 11/2008 |
| DE | 102008023585 | 1/2009 |
| DE | 102008032109 | 1/2009 |
| DE | 102007051510 | 4/2009 |
| DE | 102007052262 | 5/2009 |
| DE | 202008001022 | 6/2009 |
| DE | 102008008563 | 8/2009 |
| DE | 102008008564 | 8/2009 |
| DE | 102008041486 | 2/2010 |
| DE | 102008059602 | 6/2010 |
| DE | 102009036511 | 2/2011 |
| DE | 102009046280 | 5/2011 |
| DE | 112009001055 | 7/2011 |
| DE | 102011008895 | 7/2012 |
| DE | 102011077156 | 12/2012 |
| DE | 102008040476 | 4/2013 |
| DE | 102008052757 | 2/2014 |
| DE | 102008032110 | 2/2015 |
| DE | 102013012909 | 2/2015 |
| DE | 102014104224 | 10/2015 |
| DE | 10241697 | 5/2016 |
| EP | 0268026 | 8/1993 |
| EP | 0956895 | 11/1999 |
| EP | 1008732 | 3/2004 |
| EP | 1314864 | 1/2007 |
| EP | 2221459 | 8/2010 |
| EP | 2282026 | 2/2011 |
| EP | 2295755 | 3/2011 |
| EP | 2405109 | 1/2012 |
| EP | 2492465 | 8/2012 |
| EP | 2465602 | 11/2013 |
| EP | 2687286 | 1/2014 |
| EP | 2295756 | 3/2014 |
| EP | 1990513 | 9/2014 |
| EP | 2860369 | 4/2015 |
| EP | 2860370 | 4/2015 |
| EP | 2325452 | 5/2015 |
| EP | 2884069 | 6/2015 |
| EP | 2980379 | 2/2016 |
| FR | 2897646 | 8/2008 |
| FR | 2947003 | 6/2009 |
| FR | 2966197 | 10/2010 |
| FR | 2965011 | 3/2012 |
| FR | 2977632 | 1/2013 |
| JP | H2223624 | 2/1989 |
| JP | H0296212 | 4/1990 |
| JP | 2001030093 | 2/2001 |
| JP | 2005127271 | 5/2005 |
| JP | 2007000783 | 1/2007 |
| JP | 2007000784 | 1/2007 |
| JP | 2007146700 | 6/2007 |
| JP | 2008014213 | 1/2008 |
| JP | 2009030560 | 2/2009 |
| JP | 2009156068 | 7/2009 |
| JP | 2009156069 | 7/2009 |
| JP | 2009209822 | 9/2009 |
| JP | 2013002367 | 1/2013 |
| KR | 20090069237 | 6/2009 |
| KR | 20090105593 | 10/2009 |
| KR | 20110049152 A | 5/2011 |
| SE | 531199 | 1/2009 |
| WO | 9701387 | 1/1997 |
| WO | 0066885 | 11/2000 |
| WO | 2006123511 | 11/2006 |
| WO | 2007073957 | 7/2007 |
| WO | 2007115748 | 10/2007 |
| WO | 2008027146 | 3/2008 |
| WO | 2008034981 | 3/2008 |
| WO | 2008080695 | 7/2008 |
| WO | 2008122724 | 10/2008 |
| WO | 2009012859 | 1/2009 |
| WO | 2009012885 | 1/2009 |
| WO | 2009030858 | 3/2009 |
| WO | 2009068136 | 6/2009 |
| WO | 2009098096 | 8/2009 |
| WO | 2010055239 | 5/2010 |
| WO | 2010056793 | 5/2010 |
| WO | 2010078052 | 7/2010 |
| WO | 2010088208 | 8/2010 |
| WO | 2010149410 | 12/2010 |
| WO | 2011043993 | 4/2011 |
| WO | 2011056676 | 5/2011 |
| WO | 2011106487 | 9/2011 |
| WO | 2011110885 | 9/2011 |
| WO | 2011139953 | 11/2011 |
| WO | 2011163395 | 12/2011 |
| WO | 2012013562 | 2/2012 |
| WO | 2012044233 | 4/2012 |
| WO | 2012047159 | 4/2012 |
| WO | 2012050509 | 4/2012 |
| WO | 2012052560 | 4/2012 |
| WO | 2012053960 | 4/2012 |
| WO | 2012054437 | 4/2012 |
| WO | 2012080585 | 6/2012 |
| WO | 2012096971 | 7/2012 |
| WO | 2012120000 | 9/2012 |
| WO | 2013010700 | 1/2013 |
| WO | 2013035112 | 3/2013 |
| WO | 2013036406 | 3/2013 |
| WO | 2013048309 | 4/2013 |
| WO | 2013099312 | 7/2013 |
| WO | 2013099313 | 7/2013 |
| WO | 2013099314 | 7/2013 |
| WO | 2013112154 | 8/2013 |
| WO | 2013178321 | 12/2013 |
| WO | 2014017310 | 1/2014 |
| WO | 2014047091 | 3/2014 |
| WO | 2014051617 | 4/2014 |
| WO | 2014051617 A1 | 4/2014 |
| WO | 2014077023 | 5/2014 |
| WO | 2014112063 | 7/2014 |
| WO | 2014112067 | 7/2014 |
| WO | 2014112072 | 7/2014 |
| WO | 2014112073 | 7/2014 |
| WO | 2014115461 | 7/2014 |
| WO | 2014182832 | 11/2014 |
| WO | 2015012829 | 1/2015 |
| WO | 2015018971 | 2/2015 |
| WO | 2015020820 | 2/2015 |
| WO | 2015074926 | 5/2015 |
| WO | 2015076765 | 5/2015 |
| WO | 2015130640 | 9/2015 |
| WO | 2015151282 | 10/2015 |
| WO | 2015187128 | 12/2015 |
| WO | 2016013319 | 1/2016 |

OTHER PUBLICATIONS

Jean et al., New Concepts for the Urea Injection Area in SCR Exhaust Systems for Passenger Cars, Aachen Congress, p. 1373-2010, 2010, 18 pages.
Rusch et al., Urea SCR Interaction of Spray Generation and Exhaust System, 3rd International CTI Forum SCR-System, Bonn, Apr. 2008, 30 pages.
International Search Report and Written Opinion for International Application No. PCT/US2016/028229 mailed Jul. 28, 2016.
International Search Report for PCT International Application Serial No. PCT/EP2008/005170, completed Sep. 22, 2008, (4 pages).
International Preliminary Report on Patentability for PCT Application Serial No. PCT/EP2008/005170, dated Mar. 9, 2010, (6 pages).

* cited by examiner

390 DEG ROTATION

450 DEG ROTATION

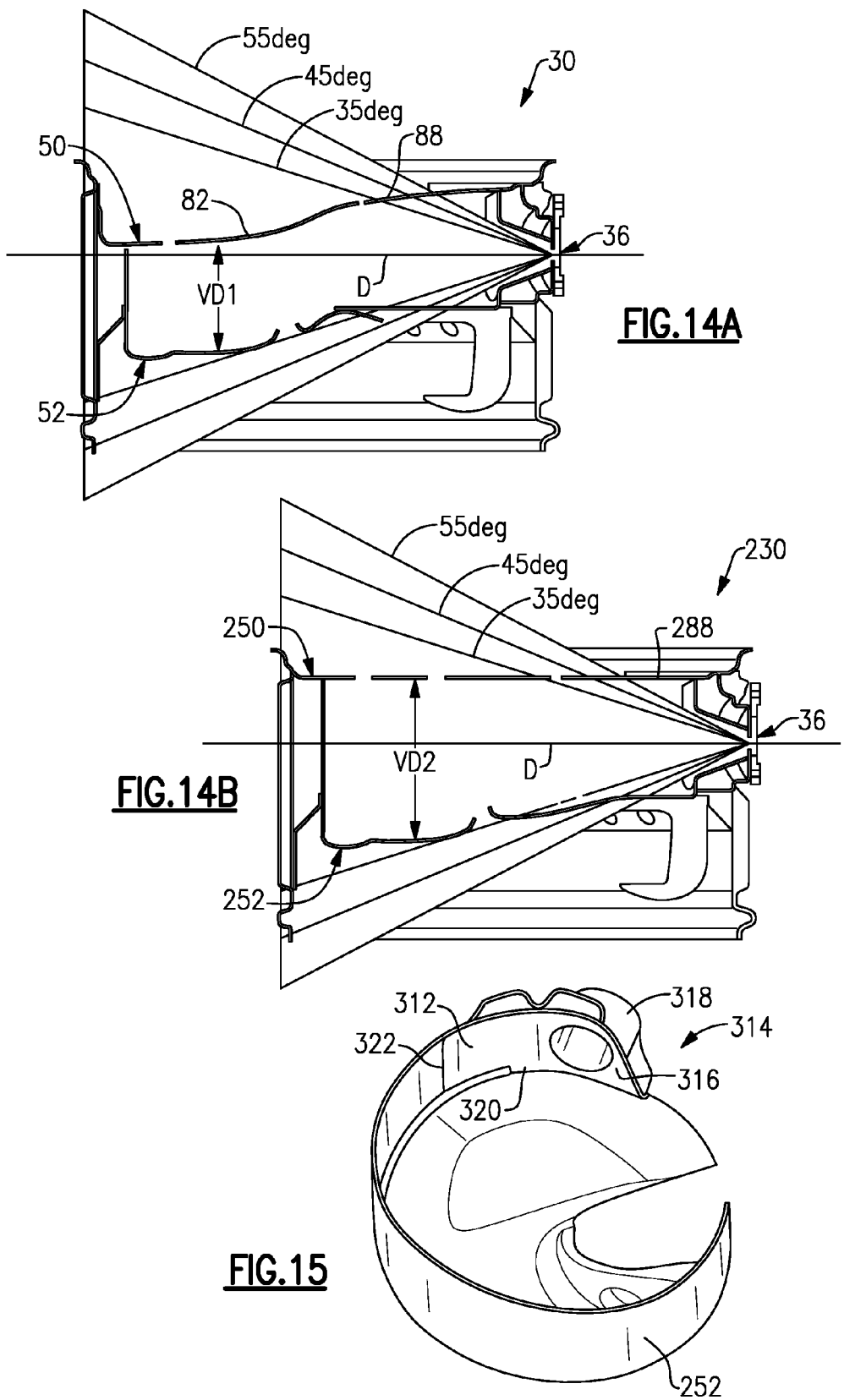

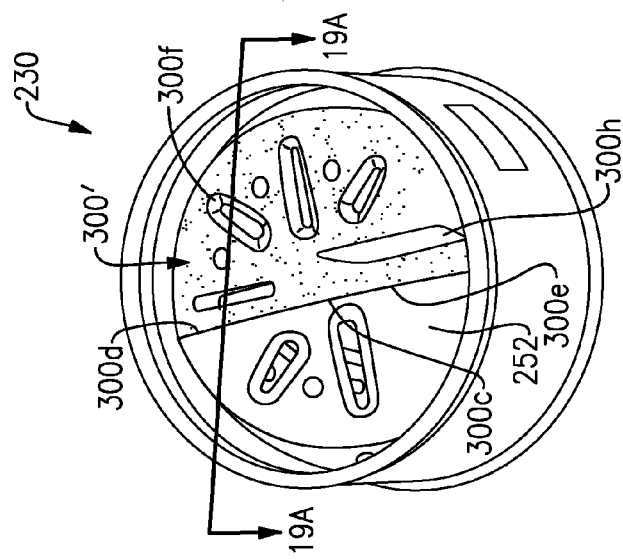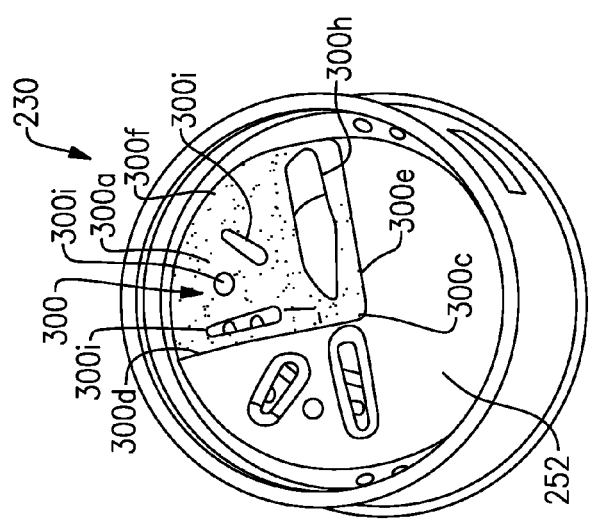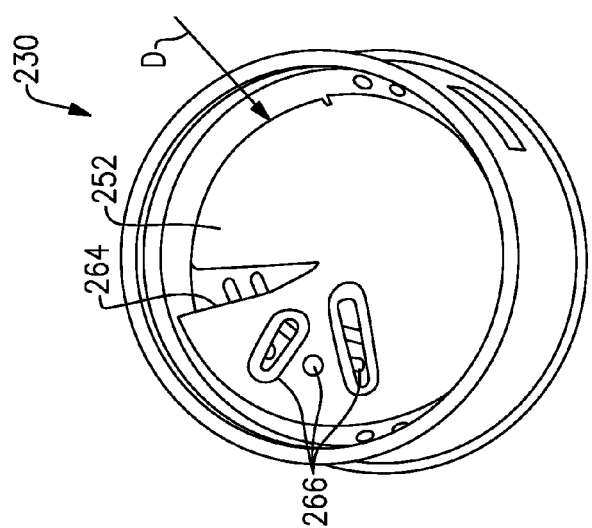

MIXER FOR USE IN A VEHICLE EXHAUST SYSTEM

CROSS-REFERENCE TO RELATED APPLICATION

This continuation-in-part application claims priority to U.S. patent application Ser. No. 14/737,533, filed Jun. 12, 2015, which claims priority to U.S. Provisional Patent Application No. 62/155,007, filed Apr. 30, 2015.

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF) or a reducing agent, such as a solution of urea and water for example, upstream of a selective catalytic reduction (SCR) catalyst. A mixer is positioned upstream of the SCR catalyst and mixes engine exhaust gases and products of urea transformation.

The mixer includes an upstream baffle with an inlet opening and a downstream baffle with an outlet opening, with the upstream and downstream baffles being surrounded by an outer peripheral wall. A doser is mounted at an opening formed within the outer peripheral wall to spray the DEF into the exhaust stream. The spray tends to have a larger droplet size in order to provide a high spray penetration such that the droplets are spread across the entire mixer cross-section. However, smaller droplet sizes are preferred as droplets with smaller diameters evaporate more quickly than larger diameter droplets.

Due to packaging constraints it is important to provide a compact configuration for the mixer by minimizing the length of the mixer. Typically, mixers having a short length also have a large exhaust flow cross-sectional area. This is disadvantageous when using smaller droplet sizes as the droplets tend not to penetrate sufficiently into the exhaust flow. Thus, having the desired shorter mixing length and the desired smaller spray droplet size are at odds with each other. Not only must the droplets have a high spray penetration, the droplets must be distributed evenly.

In one known compact mixer configuration set forth in U.S. Pat. No. 8,661,792, the inlet and outlet openings are orientated relative to each other such that the flow path provides 300 degrees of rotation from the inlet opening to the outlet opening. While this degree of rotation facilitates penetration and distribution, it is desirable to further improve mixing performance without increasing the mixer length.

SUMMARY OF THE INVENTION

In one exemplary embodiment, a mixer for a vehicle exhaust system includes a mixer body defining a mixer central axis and having an inlet configured to receive engine exhaust gas and an outlet. The mixer further includes an upstream baffle positioned within the mixer body and a downstream baffle positioned within the mixer body to be spaced from the upstream baffle in a direction along the mixer central axis. A doser defines a doser axis and is positioned to spray a reducing agent into an area between the upstream baffle and the downstream baffle such that a mixture of reducing agent and exhaust gas exits the outlet. The mixture moves through a rotational flow path that is at least 360 degrees before exiting the outlet.

In a further embodiment of the above, the upstream baffle includes a first portion, a second portion offset from the first portion in a direction along the mixer central axis, and a third portion that transitions from the first portion to the second portion, and wherein the upstream baffle includes at least one primary inlet opening; and the downstream baffle includes a first portion, a second portion offset from the first portion in a direction along the mixer central axis, and a third portion that transitions from the first portion to the second portion, and wherein the downstream stream baffle includes at least one primary outlet opening.

In a further embodiment of any of the above, an extension plate is positioned within the mixer body downstream of the downstream baffle, the extension plate including at least one main plate outlet opening such that from an upstream location between the upstream baffle and downstream baffle at the doser axis to a downstream location at a center axis of the main plate outlet opening, the mixture goes through at least 390 degrees rotation.

In a further embodiment of any of the above, at least one of the upstream baffle and the downstream baffle includes at least one secondary opening that includes a lip, and wherein the lip extends away from a respective one of the upstream baffle and the downstream baffle to define a lip height that is at least three times a material thickness of the respective one of the upstream baffle and the downstream baffle.

In a further embodiment of any of the above, the first portion of the upstream baffle comprises a first flat surface, the second portion comprises a second flat surface that is smaller than the first flat surface, and the third portion comprises a helical surface that transitions from the first flat surface to the second flat surface, and wherein the upstream baffle includes a vertical wall portion extending between the first and second flat surface which includes the at least one primary inlet opening.

In a further embodiment of any of the above, the at least one primary inlet opening comprises at least three inlet openings formed in the vertical wall portion.

In a further embodiment of any of the above, the first flat surface comprises at least half of the upstream baffle.

In a further embodiment of any of the above, the upstream baffle includes a plurality of secondary inlet openings that are only formed within the first flat surface with a remaining portion of the upstream baffle being free from secondary inlet openings.

In a further embodiment of any of the above, the first portion of the downstream baffle comprises a first flat surface, the second portion comprises a second flat surface offset from the first flat surface, and the third portion comprises a helical surface that transitions from the first flat surface to the second flat surface, and wherein the primary outlet opening comprises an open area formed within a vertical offset between the first and second flat surfaces of the downstream baffle.

In a further embodiment of any of the above, the downstream baffle includes at least one secondary outlet opening, and wherein at least half of the downstream baffle has a solid surface free from secondary outlet openings, and wherein the solid surface of the downstream baffle is aligned with the doser axis such that a spray zone defined by the doser extends over the solid surface without encountering any secondary outlet openings.

These and other features of this application will be best understood from the following specification and drawings, the following of which is a brief description.

BRIEF DESCRIPTION OF THE DRAWINGS

FIG. 14A is a section view of baffles from the mixer shown in FIG. 2A.

FIG. 14B is a section view of baffles from the mixer shown in FIG. 12.

FIG. 15 is a perspective view of a downstream baffle and sub-assembly from the mixer of FIG. 12.

FIG. 17A is a perspective view from the outlet end of the mixer of FIG. 12 without an extension plate.

FIG. 17B is a perspective view from the outlet end of the mixer of FIG. 12 with a first embodiment of an extension plate.

FIG. 17C is a perspective view from the outlet end of the mixer of FIG. 12 with a second embodiment of an extension plate.

DETAILED DESCRIPTION

Figure 1:
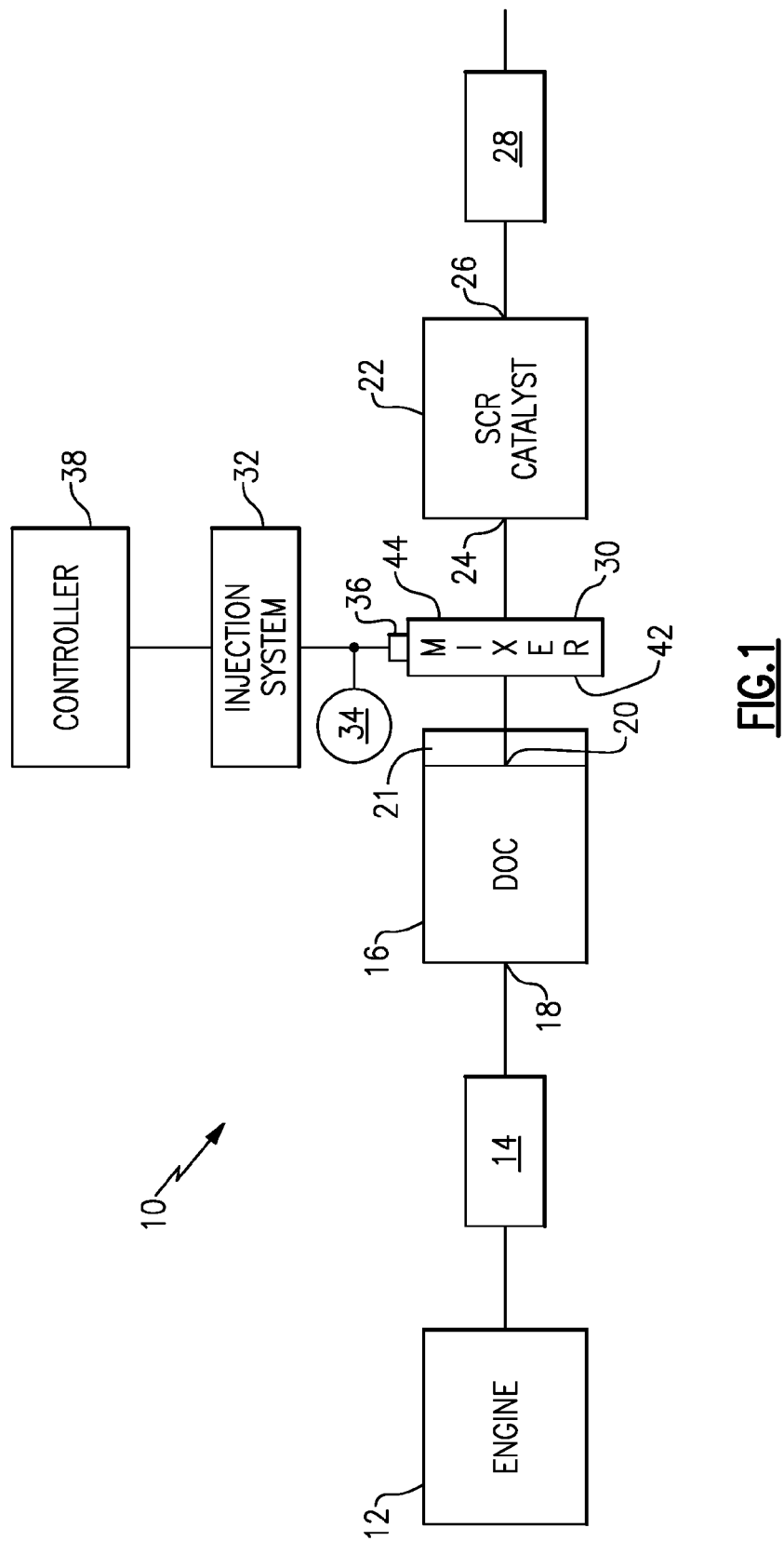
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example configuration, the upstream exhaust components 14 direct exhaust gases into a diesel oxidation catalyst (DOC) 16 having an inlet 18 and an outlet 20. Downstream of the DOC 16 is an optional component 21 that may be a diesel particulate filter (DPF), which is used to remove contaminants from the exhaust gas as known. In one example, the component 21 may be the DPF and a subsequent portion of exhaust pipe with an optional elbow type connection. In another example, the component 21 may be a portion of exhaust pipe with an optional elbow type connection. Downstream of the DOC 16 and optional component 21 is a selective catalytic reduction (SCR) catalyst 22 having an inlet 24 and an outlet 26. The inlet 24 may be located away from the mixer outlet face 44. In this example an exhaust system pipe will drive the exhaust flow to the catalyst 22. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 or component 21 and upstream of the inlet 24 of the SCR catalyst 22. The upstream catalyst and downstream catalyst can be in-line, in parallel or any other configuration. The mixer 30 (as shown in the in-line configuration) is used to generate a swirling or rotary motion of the exhaust gas. An injection system 32 is used to inject a gaseous or liquid reducing agent, such as a solution of urea and water for example, into the exhaust gas stream upstream from the SCR catalyst 22 such that the mixer 30 can mix the injected substance and exhaust gas thoroughly together. In an example, the injection system 32 includes a fluid supply 34, a doser 36, and a controller 38 that controls injection of the reducing agent as known. Optionally, component 36 can be a pipe of introduction of gaseous reducing agent. Operation of the controller 38 to control injection of the reducing agent is known and will not be discussed in further detail.

The mixer 30 is shown in greater detail in FIGS. 2-9. As shown in FIG. 2A-2B, the mixer 30 comprises a mixer body having an inlet end 42 configured to receive the engine exhaust gases and an outlet end 44 to direct a mixture of swirling engine exhaust gas and products transformed from urea to the SCR catalyst 22. Further, the mixer body includes an upstream baffle 50 (FIG. 2A and FIG. 3) and a downstream baffle 52 (FIG. 2B and FIGS. 4A-4B) that are surrounded by an outer peripheral wall 54. The upstream baffle 50 is configured to initiate swirling of the exhaust gas flow. The mixer 30 also includes an inner peripheral surface 56 that faces inwardly toward a mixer center axis A (FIG. 2B).

The upstream baffle 50 at the inlet 42 may include a large inlet opening 60 that can receive the majority of the exhaust gas (for example, the large inlet opening 60 receives 60% of the exhaust mass flow rate), and which is configured to initiate the swirling motion. The upstream baffle 50 also includes a plurality of perforations, slots, or additional inlet openings 62 that ensure optimal homogenization of exhaust gases and reduces back pressure. The upstream baffle 50 and the plurality of inlet openings 60, 62 cooperate to initiate a swirling motion to the exhaust gas as the exhaust gas enters the inlet end 42 of the mixer 30.

The downstream baffle 52 includes a large outlet opening 64 (FIGS. 4A-4B) through which the majority of the exhaust gas exits. The downstream baffle 52 also includes a plurality of additional outlet openings 66 surrounded by lips 68 through which the exhaust gas exits. The lips 68 keep the urea inside the mixer 30 in order to increase DEF transformation and improve mixing performance. The lips 68 also generate additional turbulence to further improve mixing performance. The downstream baffle 52 comprises a helical portion 70. An axis of the helix is the center axis of the mixer represented by A (FIG. 2B) with a rim 72 formed about an outer perimeter of the helical portion 70. The rim 72 extends in an upstream direction.

Figure 2A:
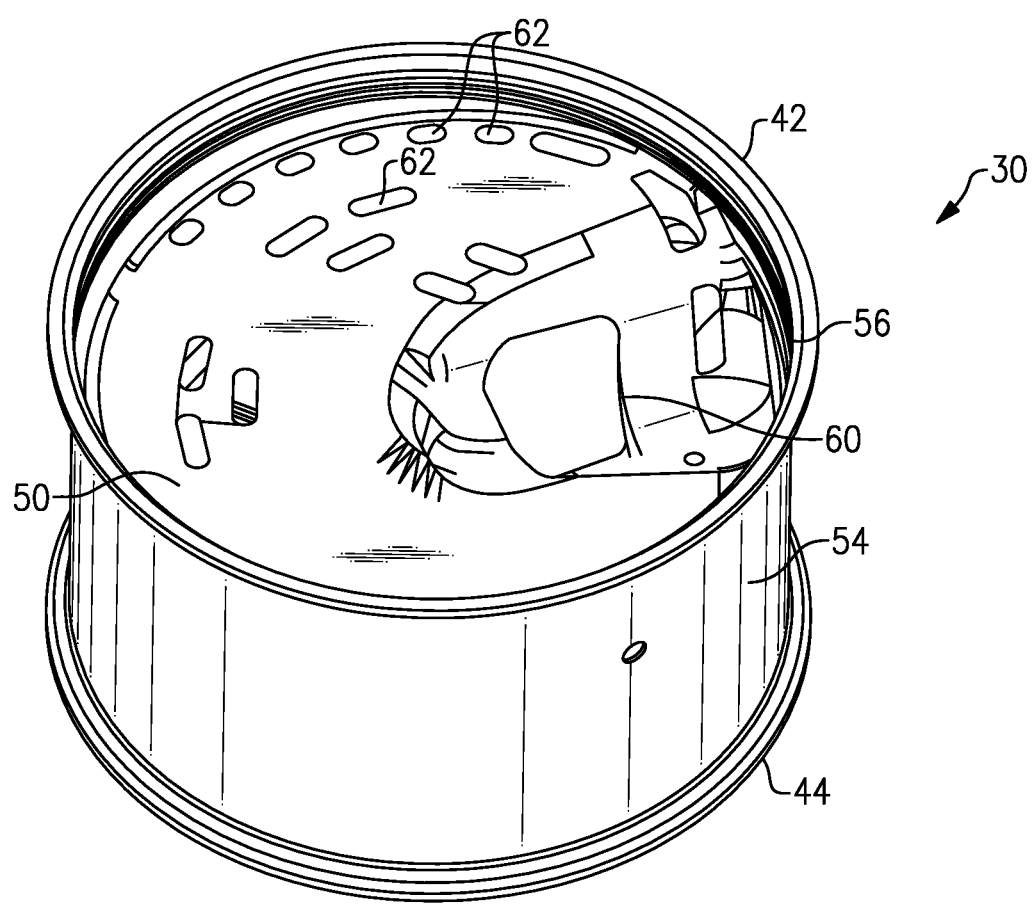
FIG. 2A is a perspective view of an upstream end of a mixer according to the subject invention.
Figure 2B:
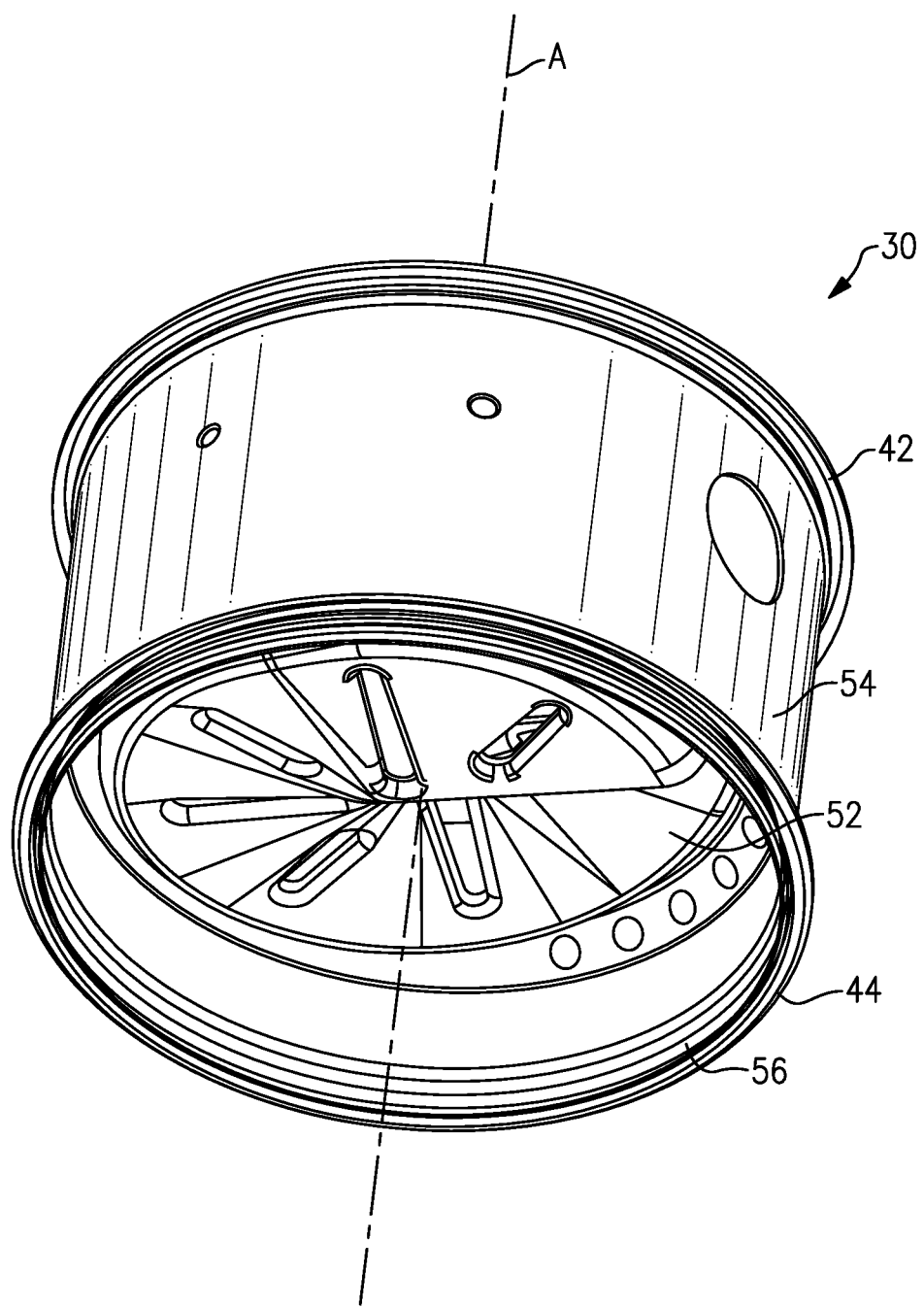
FIG. 2B is a perspective view of the mixer of FIG. 2A from a downstream end.
Figure 3:
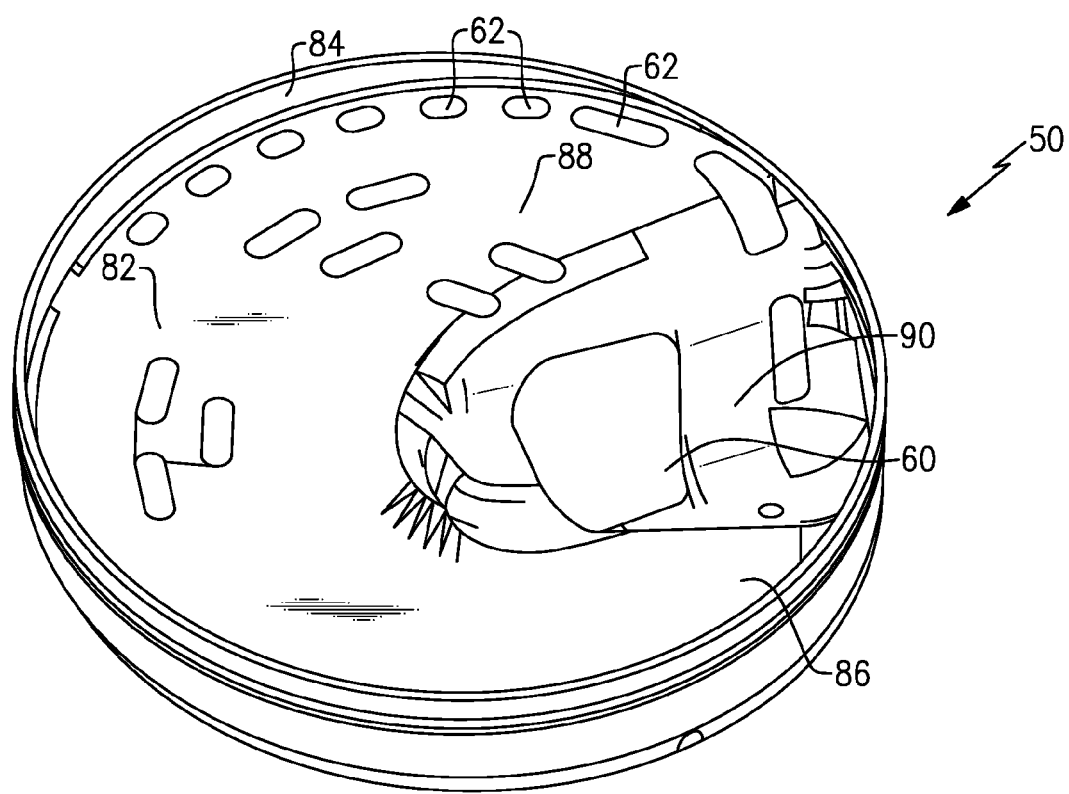
FIG. 3 is a perspective view of an upstream baffle of the mixer.
Figure 4A:
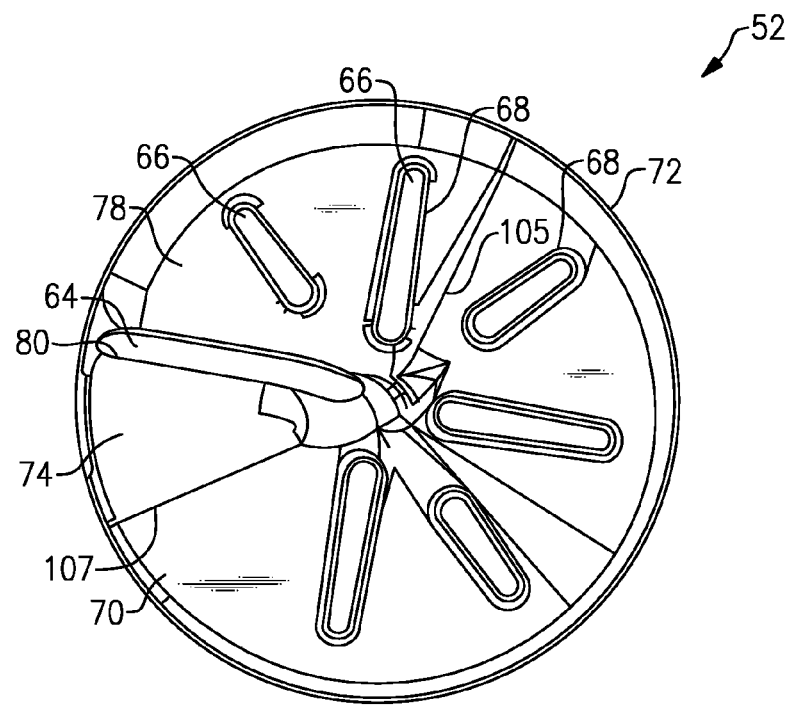
FIG. 4A is a top view of a downstream baffle of the mixer.
Figure 4B:
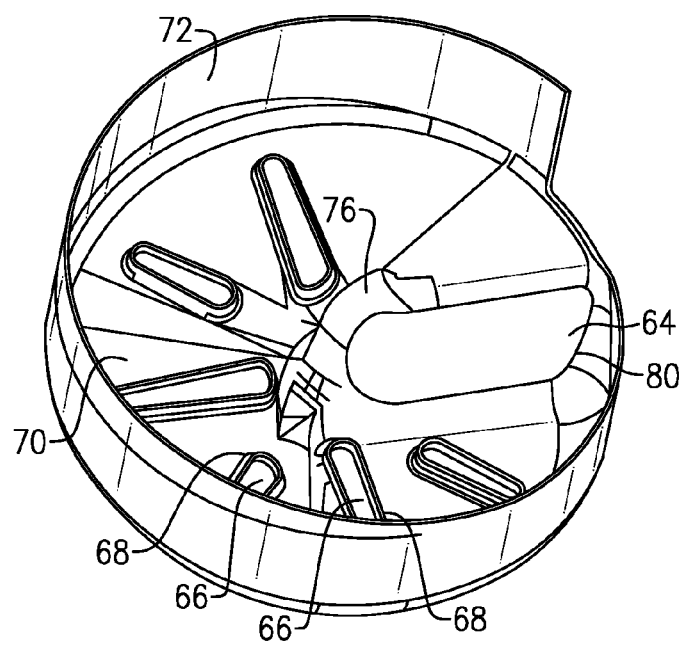
FIG. 4B is a perspective view of an upstream end face of the downstream baffle of FIG. 4A.

The large outlet opening 64 comprises a primary outlet opening and is larger than the other outlet openings 66. The helical portion 70 includes the additional outlet openings 66. The helical portion 70 is formed by an upstream end portion 74 and a downstream end portion 78. The upstream 74 and downstream 78 end portions each include a flat surface portion with the helical portion 70 extending therebetween. A transition line between the helical portion 70 and flat portion of the upstream end portion 74 is indicated at 107 in FIG. 4A. A transition line between the helical portion 70 and flat portion of the downstream end portion 78 is indicated at 105 in FIG. 4A. The flat surface portions of the end portions 74 and 78 are perpendicular to the mixer axis A (FIG. 2B). A wall 80 extends between the flat surface of the downstream end portion 78 and the flat surface of the upstream end portion 74, and the primary outlet opening 64 is formed within the wall 80. A connector ring 99 (FIG. 6) can be used to connect the baffle 52 to the wall 54 of the mixer body. Optionally, the baffle 52 could be directly attached to the wall 54.

Similarly, the upstream baffle 50 comprises a helical portion 82 with a rim 84 formed about an outer perimeter of the helical portion 82. The large inlet opening 60 comprises a primary inlet opening and may be larger than the other inlet openings 62. The helical portion 82 includes additional inlet openings 62 and has an upstream end portion 88 and a downstream end portion 86. A wall 90 extends from the upstream portion 88 to the downstream portion 86 and the primary inlet opening 60 is formed within the wall 90.

Figure 7:
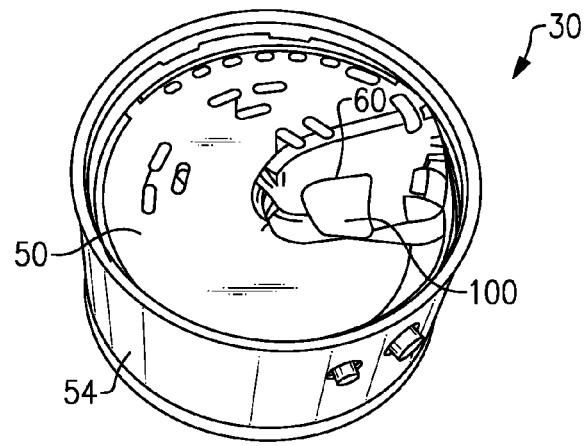
FIG. 7 is a perspective assembled view of the mixer showing the intermediate plate between the upstream and downstream baffles.

The mixer 30 includes an intermediate plate 100 (FIG. 5) positioned between the upstream 50 and downstream 52 baffles, as shown in FIG. 7, to block direct flow from the primary inlet opening 60 to the primary outlet opening 64. The intermediate plate 100 initiates a rotational flow path that directs the majority of exhaust gases exiting the primary inlet opening 60 through a rotation of more than 360 degrees about the mixer central axis A before exiting the primary outlet opening 64. In one example shown in FIG. 10, the rotation is approximately 390 degrees. In another example shown in FIG. 11, the rotation is approximately 450 degrees. This increased degree of rotation results in more thorough mixing of the reducing agent within the exhaust gas. Also, this more thorough mixing occurs without having to increase the overall length of the mixer.

As shown in FIG. 7, the intermediate plate 100 is positioned axially between the primary inlet opening 60 and primary outlet opening 64. This prevents a short circuit path of exhaust gas directly from the primary inlet opening 60 and primary outlet opening 64. Instead, the exhaust gas enters the primary inlet opening 60 and is directed by the intermediate plate 100 to move along the rim 72 to generate the rotational mixing.

Figure 5:
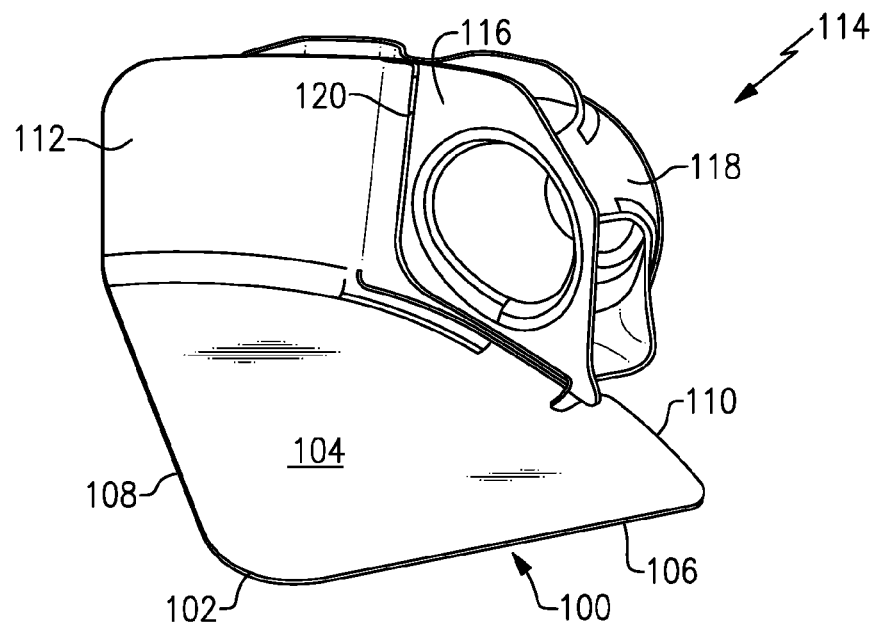
FIG. 5 is a perspective view of a sub-assembly with an intermediate plate to be included within the mixer.
Figure 6:
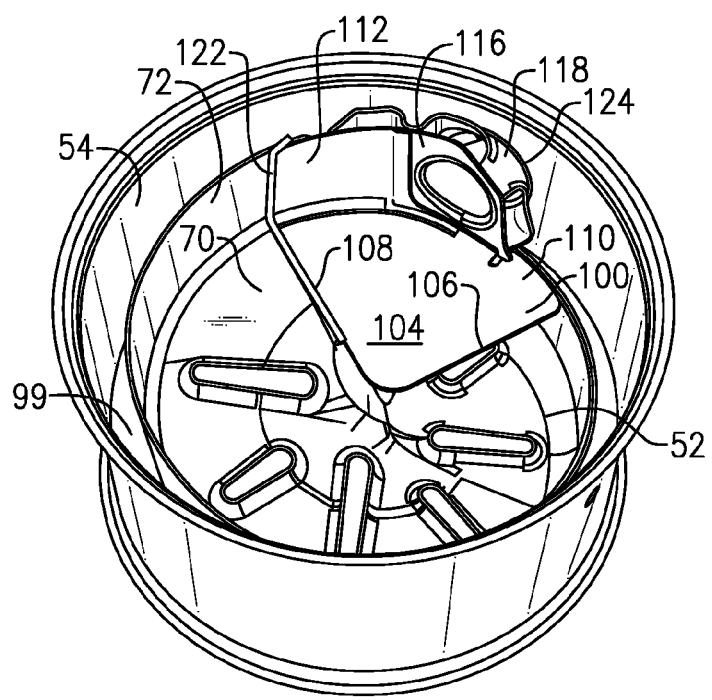
FIG. 6 is an upstream end view of the mixer showing a position of the intermediate plate and sub-assembly relative to the downstream baffle.

As shown in FIGS. 5-6, the intermediate plate 100 has an apex 102 near the mixer central axis A and which widens radially outward in a direction toward the outer peripheral wall 54. The intermediate plate 100 comprises a flat portion 104 defined by a first edge 106 extending radially outward from the apex 102, a second edge 108 extending radially outward from the apex 102 and circumferentially spaced from the first edge 106, and an outer peripheral edge 110 connecting the first 106 and second 108 edges to define a wedge-shape. The first edge 106 comprises an inlet side of the intermediate plate 100 and the second edge 108 comprises the outlet side of the intermediate plate 100. The angle defined by edge 106 and edge 108 can vary from 70 degrees to 270 degrees. The flat portion 104 can have an adjacent helical portion at the outlet side, which is the edge 108.

In one example, the intermediate plate 100 includes a flange portion 112 that extends in an upstream direction from the outer peripheral edge 110. The flange portion 112 does not extend along the entire outer peripheral edge 110. The intermediate plate 100 is attached as part of a sub-assembly 114 that additionally includes a cone plate 116 and a manifold 118 that are used to mount the doser 36 in the desired orientation position. As shown in FIG. 5, the intermediate plate 100 is attached to the cone plate 116 with a weld 120 that extends along a portion of the flange portion 112 and a portion of the outer peripheral edge 110. One or more additional welds (not shown) are used to attach the manifold 118 to the intermediate plate 100 and cone plate 116.

The sub-assembly 114 is then placed within the mixer 30 such that the flange portion 112 of the intermediate plate can be welded, or otherwise attached, to the rim 72 of the downstream baffle 52 as shown at 122 in FIG. 6. Optionally, the plate 100 may not include a flange portion and the outer peripheral edge 110 could be welded to the rim.

The outer peripheral wall 54 of the mixer 30 includes a doser mount area with a doser opening 124 to receive the doser 36. The upstream and downstream baffles 50, 52 are spaced apart from each other in an axial direction along a length of the mixer 30. The doser opening 124 for the doser 36 is positioned to spray the reducing agent into an area between the upstream baffle 50 and the intermediate plate 100.

Figure 8:
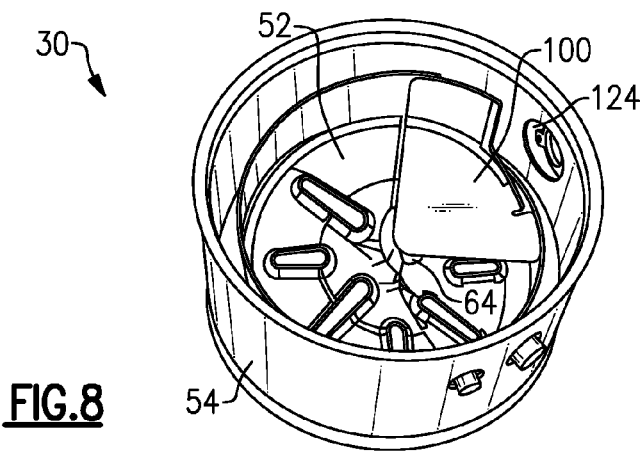
FIG. 8 is a view similar to FIG. 6 but only showing the intermediate plate.

In the example shown, the outlet side of the intermediate plate 100, i.e. the second edge 108, is aligned with the transition line 107 of the flat portion 74 of the downstream baffle 52. A weld 122 can be used to fix the second edge 108 to the transition line 107 and the flange 112 to the rim 72. Thus, the intermediate plate 100 partially overlaps the flat portion 74 and extends circumferentially beyond the primary outlet opening 64. This effectively blocks any exhaust gas entering through the primary inlet opening 60 from immediately exiting the primary outlet opening 64 (FIG. 7-8).

Figure 9:
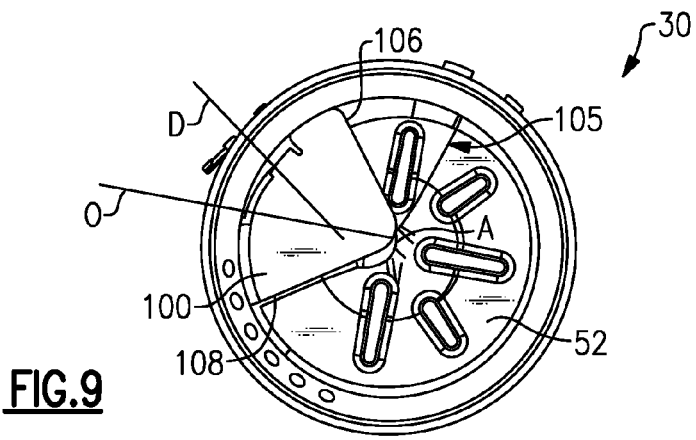
FIG. 9 is an end view showing a doser axis location in relation to the intermediate plate.
Figure 10:
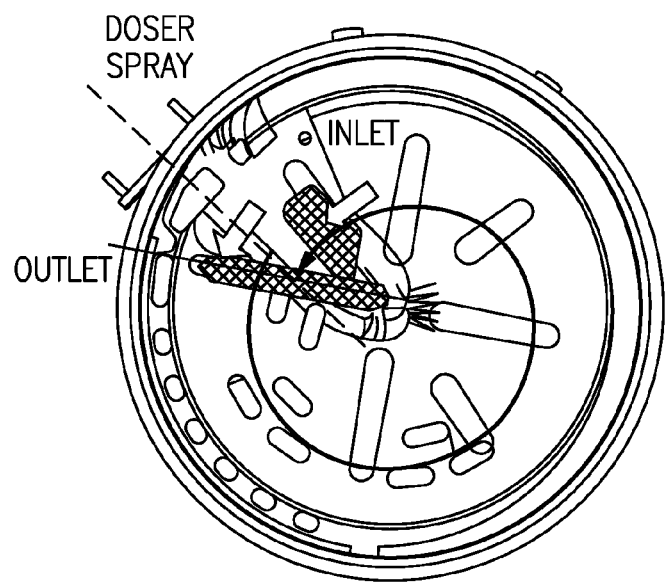
FIG. 10 is a schematic end view of the mixer showing a rotational flow path of approximately 390 degrees.

As shown in FIG. 9, the mixer 30 defines a mixer center axis A extending along a length of the mixer 30. The doser 36 defines a central doser axis D that is slightly offset relative to the center axis A of the mixer 30, i.e. axis D does not intersect axis A. The orientation of the primary outlet opening 64 is defined by axis O. From axis D to axis O, the flow can follow 390 degrees of rotation (FIG. 10).

Figure 11:
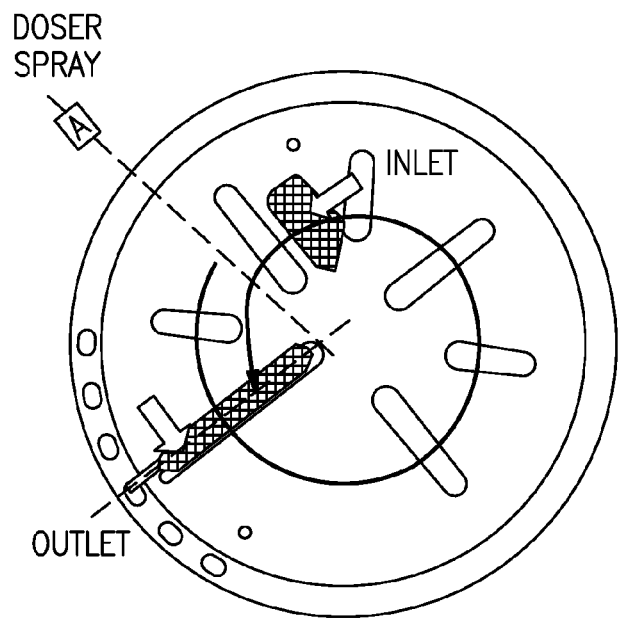
FIG. 11 is a schematic end view of the mixer showing a rotational flow path of approximately 450 degrees.

In one example embodiment, the intermediate plate 100 has the wedge-shape formed by the sides 106, 108 which are separated from each other by approximately 90 degrees. In an optional embodiment, the transition line 105 of the outlet baffle can be aligned with the inlet side 106 of the intermediate plate 100 in order to form a wedge-shape having sides 106 and 108 separated by approximately 150 degrees. This would be possible rotating the outlet baffle 52 by an additional 60 degrees resulting in a mixer having 450 degrees of rotation (FIG. 11).

As such, a compact mixer 30 is provided that allows at least 360 degrees of flow path between axis D and axis O in order to increase mixing performance and DEF transformation. This improved performance is provided without increasing the axial length of the mixer and, further, does not adversely affect back pressure. For example, this 360 to 450 degree rotation flow path is provided within a mixer having an overall length that is between 7 and 10 inches.

Figure 12:
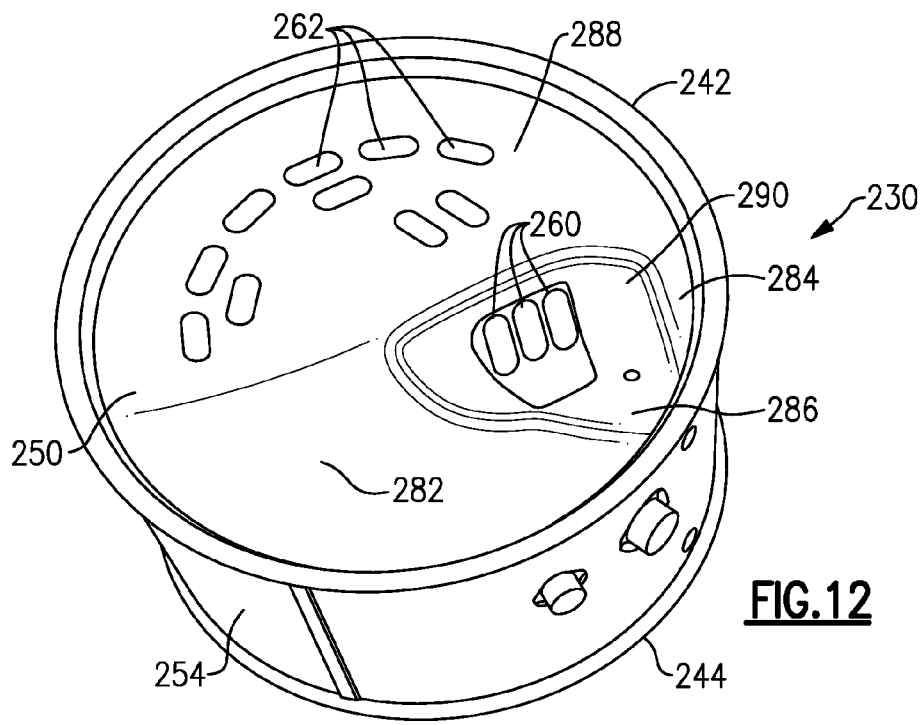
FIG. 12 is a perspective view from an inlet end of another embodiment of a mixer incorporating the subject invention.

Another example of a mixer 230 is shown in FIG. 12. In this example, the mixer 230 comprises a mixer body having an inlet end 242 configured to receive the engine exhaust gases and an outlet end 244 to direct a mixture of swirling engine exhaust gas and products transformed from urea to the SCR catalyst 22. Further, the mixer body includes an upstream baffle 250 (FIG. 12) and a downstream baffle 252 (FIG. 13) that are surrounded by an outer peripheral wall 254 of a ring-shaped structure. The upstream baffle 250 is configured to initiate swirling of the exhaust gas flow. The ring-shaped structure also includes an inner peripheral surface 256.

The upstream baffle 250 has an upstream end portion 288 and a downstream end portion 286 with a helical portion 282 transitioning between the upstream end portion 288 and the downstream end portion 286. An outer rim 284 is formed about an outer perimeter of the upstream baffle 250. The upstream end portion 288 provides a generally large flat area and the downstream end portion 286 comprises a generally smaller flat area that is offset from the flat area of the upstream end portion 288 in a direction along the axis A. The helical portion 282 comprises a surface that transitions between the two offset flat areas to facilitate the swirling motion.

In the example shown, the flat area of the upstream end portion 288 comprises approximately at least 180 degrees, i.e. about half, of the surface area of the upstream baffle 250, with the helical portion 282 and flat area of the downstream end portion 286 comprising the other 180 degrees, i.e. the other half. FIG. 14A, which corresponds to the embodiment of the upstream baffle 50 shown in FIG. 2A, can be compared to FIG. 14B, which corresponds to the upstream baffle 250 as shown in FIG. 12. In the FIG. 14A embodiment, the end portion at the upstream end 88 is much smaller than the flat portion for the FIG. 14B embodiment, and the helical portion 82 has a more gradual slope transitioning from the upstream end 88 to the downstream end 86. FIG. 14B, which has the flat area extending over at least 180 degrees, has a helical portion 282 with a much steeper slope than the embodiment of FIG. 14A. This provides for more room in a vertical direction within the mixing area of the mixer 230.

The doser axis D is shown in both FIGS. 14A and 14B. In the FIG. 14A embodiment of the mixer 30 there is a first vertical distance VD1 between the baffles 50, 52. In the FIG. 14B embodiment of the mixer 230 there is a second vertical distance VD2 between the baffles 250, 252 that is greater than the first vertical distance VD1. It is clear from FIGS. 14A and 14B, that the doser axis $D_{[CL1]}$, which corresponds generally to a center of a spray zone SZ (FIG. 13), intersects with the upstream baffle 50 of the mixer 30 much sooner than the axis D intersects the upstream baffle 250 of the mixer 230 of FIG. 14B. This improves the amount of penetration of the spray into the mixer 230 as there is more room as compared to the mixer 30 of FIG. 2A.

The upstream baffle 250 also includes a vertical wall 290 that extends from the upstream portion 288 to the downstream portion 286, and which has the primary exhaust gas inlet into the mixer 230. Instead of having one large primary inlet opening 60 in the upstream baffle 50 (FIG. 2A), this configuration includes a plurality of primary inlet openings 260 in the wall 290 of the upstream baffle 250 that receive the majority of the exhaust gas (for example, the primary inlet openings 260 receive 60% of the exhaust mass flow rate. The upstream baffle 250 also includes a plurality of secondary inlet openings 262 that ensure optimal homogenization of exhaust gases and reduces back pressure. The upstream baffle 250 and the inlet openings 260, 262 cooperate to initiate a swirling motion to the exhaust gas as the exhaust gas enters the inlet end 242 of the mixer 230.

As discussed above, the primary inlet openings 260 are formed within the wall 290. The flat area of the upstream end portion 288 includes the additional or secondary inlet openings 262. The secondary inlet openings 262 can be the same size and/or shape as the primary inlet openings, or could be slightly smaller and/or have a different shape. In one example, the baffle portion 282 and the flat area of the downstream end portion 286 do not include any secondary inlet openings, i.e. the secondary inlet openings 262 are only formed in the flat area of the upstream end portion 288.

In the example shown in FIG. 12, there are three (3) primary inlet openings 260 that are used instead of the single primary inlet opening 60. It should be understood that, depending on the application, only two primary inlet openings 260, or more than three primary inlet openings 260 could be used. In one example, the primary inlet openings 260 have an elongated shape, such as a slot shape, with a larger dimension in a first direction to define a slot length, and a smaller dimension in a second direction to define a slot height. In the example shown, the larger dimension extends along the wall 290 in a direction that is from the flat area of the downstream end portion 286 toward the flat area of the upstream end portion 288.

In the example shown, the primary inlet openings 260 are the same size and are spaced apart from each other along the wall 290 in a radial direction. The openings 260 could also be orientated in a different configuration and have different sizes. One benefit have having multiple primary inlet openings 260 as opposed to a single large inlet opening is that the multiple inlet openings 260 help reduce the force of exhaust gas applied against the spray, which reduces the amount of spray that would be forced against the inner peripheral surface 256.

Figure 13:
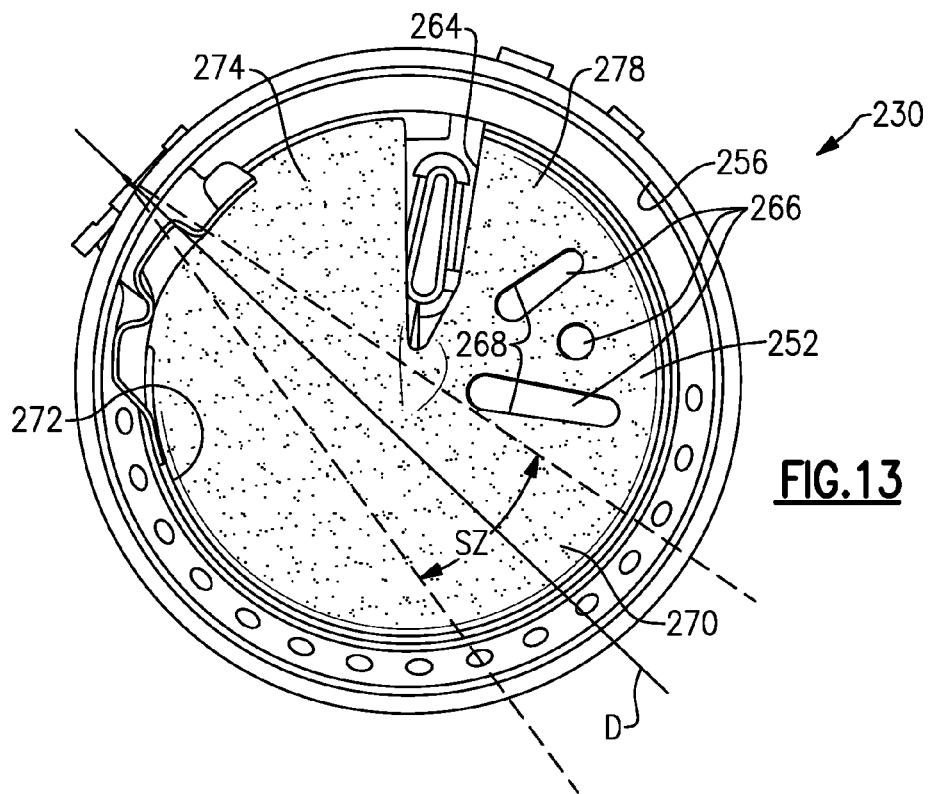
FIG. 13 is a perspective view from an outlet end of the mixer of FIG. 12.

As shown in FIG. 13, the downstream baffle 252 includes a large primary outlet opening 264 through which the majority of the exhaust gas exits. The downstream baffle 252 also includes one or more secondary outlet openings 266 surrounded by lips 268 through which the exhaust gas exits. The lips 268 keep the urea inside the mixer 230 to increase DEF transformation and generate additional turbulence to further improve mixing performance.

The downstream baffle 252 has an upstream end portion 274 and a downstream end portion 278 with a helical portion 270 transitioning between the upstream end portion 274 and the downstream end portion 278. An outer rim 272 is formed about an outer perimeter of the downstream baffle 252. The upstream end portion 274 comprises a flat area that transitions to a flat area at the downstream end portion 278 via the helical portion 270. The two flat areas are offset from each other in a direction along the axis A. The helical portion 270 comprises a surface that transitions between the two offset flat areas to facilitate the swirling motion. The downstream baffle 252 also includes a vertical wall 280 that extends from the upstream portion 274 to the downstream portion 278, and which has the primary outlet opening 264 that is larger than the secondary outlet openings 266. In the example shown, the primary outlet opening 264 comprises an open area formed within the vertical offset between the flat areas of the upstream end portion 274 and downstream end portion 278.

In the example shown, at least 180 degrees, i.e. at least half, of the downstream baffle has a solid surface, i.e. there are no secondary outlet openings 266. This solid surface of the downstream baffle 252 is aligned with the doser axis D such that a spray zone SZ extends over this solid surface as shown in FIG. 13. The secondary openings 266 are thus formed in the downstream end portion 278 adjacent the primary outlet opening 264 and do not overlap the spray zone SZ. In the example shown, there are three secondary openings 266, each having a different size. Further, at least one opening is slot shaped and at least one opening is circular shaped; however, various combinations of shapes and sizes could be used. Further, it should be understood that more or less than three secondary openings could also be used depending upon the application.

With the mixer 230 as shown in FIGS. 12-13, the flat portion 104 of the intermediate plate 100 (FIG. 7) is no longer positioned between the baffles 250, 252. Instead, as shown in FIG. 15, a sub-assembly 314 comprising a cone plate 316 and a manifold 318 are used in a manner that is similar to the cone plate 116 and manifold 118 of the mixer 30 as shown in FIGS. 5-6. The cone plate 316 is modified to include a wall portion 312 that is similar to the flange portion 112 of the mixer 30.

The manifold 318 is attached to the cone plate 316 in a manner similar to that described above with regard to the mixer 30. The sub-assembly 314 is then attached to the downstream baffle 252 with a first weld 320 along a circumferential edge of the cone plate 316 and with a second weld 322 along the wall portion 312. It should be understood that while welding interfaces are shown, other attachment methods could also be used, such as brazing for example.

Figure 16:
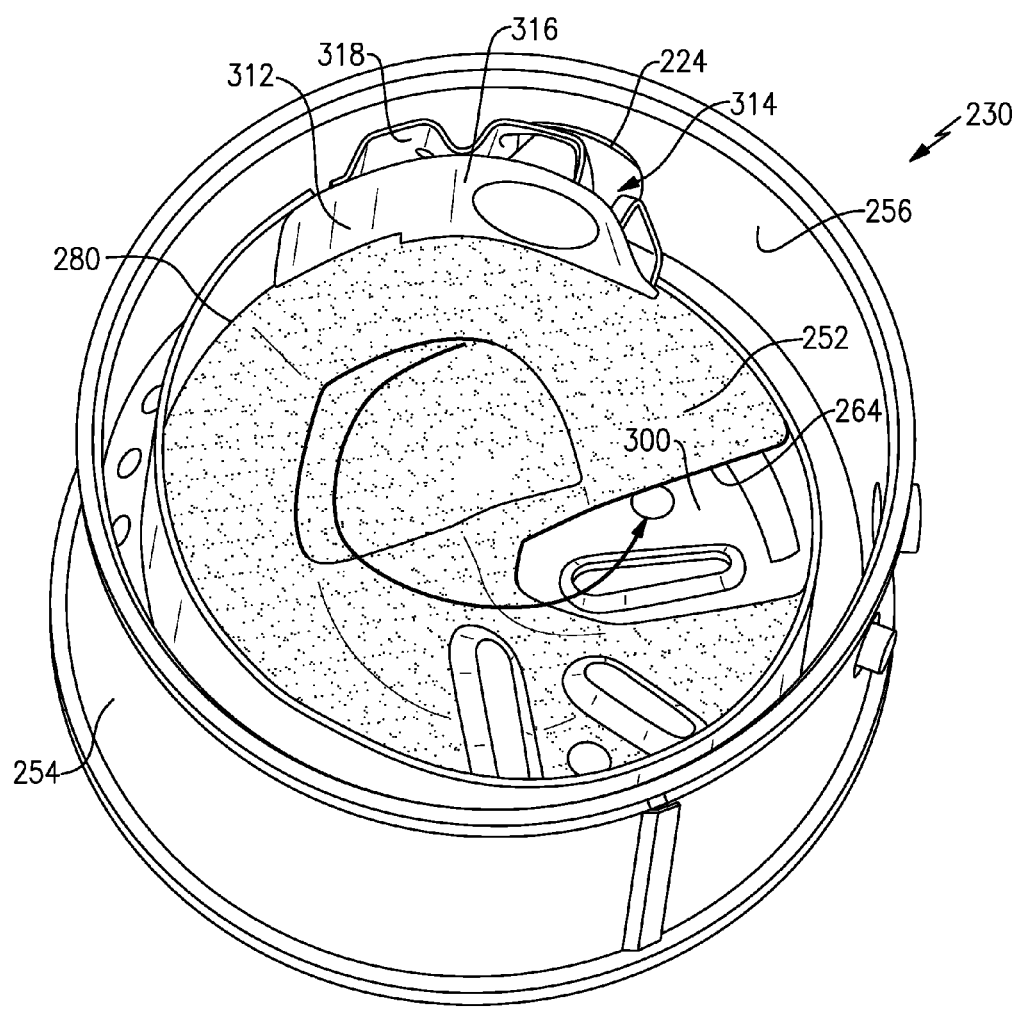
FIG. 16 is a perspective view from the inlet end of the mixer of FIG. 12 but with the upstream baffle being removed.

As shown in FIG. 16, the outer peripheral wall 254 of the mixer 230 includes a doser mount area with a doser opening 224 to receive the doser 36. The upstream and downstream baffles 250, 252 are spaced apart from each other in an axial direction along a length of the mixer 230. The doser opening 224 for the doser 36 is positioned to spray the reducing agent into an area between the upstream baffle 250 and the downstream baffle 252.

When the mixture of spray and exhaust gas exits the primary outlet opening 264 of the downstream baffle 252, the mixture is directed against an extension baffle 300. Thus, the extension baffle 300 is located within the mixer 230 at a location that is downstream of the outlet or downstream baffle 252. The use of extension baffle 300 at this location improves flow distribution and results in better performance for the mixer 230 as compared to the mixer 30.

FIG. 17A shows a view from the outlet end of the mixer 230 without the extension baffle 300. FIG. 17B shows a first embodiment of the extension baffle 300 where the baffle 300 is configured to overlap approximately 90 degrees of the downstream baffle 252. FIG. 17C shows a second embodiment of the extension baffle 300' where the baffle 300' is configured to overlap approximately 180 degrees of the downstream baffle. In each embodiment, the extension baffle 300, 300' includes a generally flat base 300a with circumferential wall portion 300b (FIGS. 20C-D) extending in an upstream direction from an outer peripheral edge of the base 300a.

The flat base 300a comprises a wedge shape that has an apex or center 300c near the mixer central axis A and which widens radially outward in a direction toward the outer peripheral wall 254. The flat base 300a is defined by a first edge 300d extending radially outward from the apex 300c, a second edge 300e extending radially outward from the apex 300c and circumferentially spaced from the first edge 300d, and an outer peripheral edge 300f connecting the first 300d and second 300e edges. The first edge 300d comprises an inlet side or upstream side of the extension baffle 300 and the second edge 300e comprises an outlet side or downstream side of the extension baffle 300. In the example shown, the angle defined by the edges 300d, 300e is approximately 90 degrees; however the angle could be increased or decreased as needed dependent upon the application.

As discussed above, the circumferential wall portion 300b extends in the upstream direction from the outer peripheral edge 300f. A radial wall portion 300g extends in the upstream direction from the second edge 300e of the flat base 300a. The radial wall portion 300g includes a large primary outlet opening 300h through which a majority of the mixture of exhaust gas and reducing agent exits the mixer 230. The base 300a includes one or more secondary outlet openings 300i which are smaller in size than the primary outlet opening 300h. The secondary outlet openings 300i can be circular or slot shaped, or any combination thereof. Other shapes and different size configurations could also be used. Further, while two slot shaped openings and one circular shaped opening are shown in FIG. 17B, fewer or more openings in any shape or size combination, could also be used dependent upon the application.

The extension baffle 300' of FIG. 17C is similar to that of the baffle 300 of FIG. 17B, but the angle defined by the edges 300d, 300e has been increased to approximately 180 degrees. It should be understood that the angle could be modified to be anywhere between 90 and 180 degrees and could also be increased above 180 degrees or decreased below 90 degrees as needed dependent upon the application.

Figure 18A:
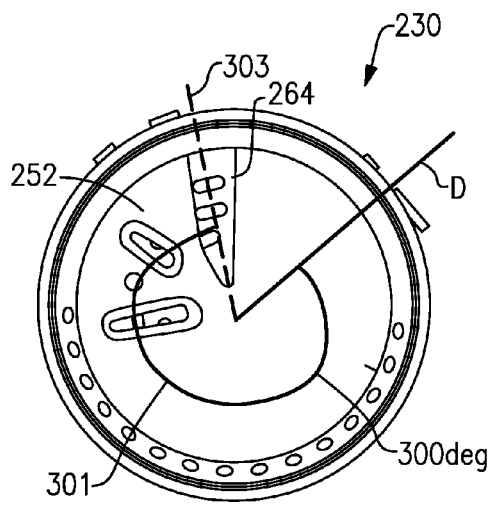
FIG. 18A is an end view of the mixer of FIG. 17A showing a rotational flow path for the mixer of FIG. 17A.

FIG. 18A shows the view from the mixer outlet with the primary outlet opening 264 of the downstream baffle 252 being shown in relation to the doser axis D. As indicated by the arrow 301, from an upstream location at the doser axis D to a downstream location at a center axis 303 of the outlet opening 264, there is less than 360 degrees rotation (approximately 300 degrees of rotation is shown in FIG. 18A). The embodiments of FIG. 18C provide for significantly more rotation prior to the mixture exiting the mixer 230.

Figure 18B:
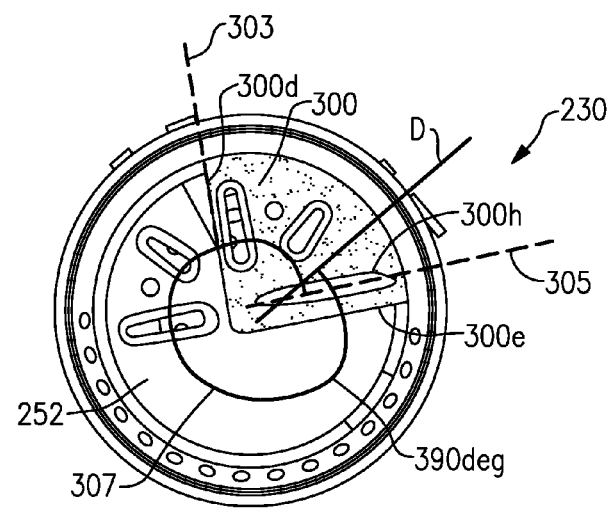
FIG. 18B is an end view of the mixer of FIG. 17B showing a rotational flow path for the mixer of FIG. 17B.
Figure 18C:
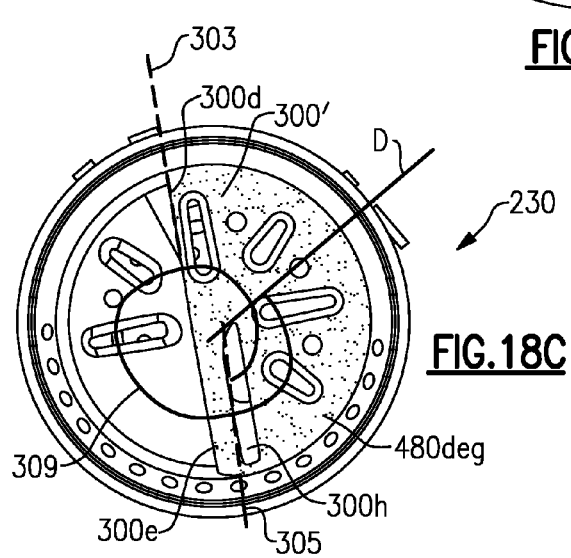
FIG. 18C is an end view of the mixer of FIG. 17C showing a rotational flow path for the mixer of FIG. 17C.

FIG. 18B shows a relationship between an outlet from the mixer 230 and the doser axis D for the extension baffle 300 configuration of FIG. 17B. The upstream or first edge 300d of the flat base 300a is generally aligned along the center axis 303 of the primary outlet opening 264 of the downstream baffle 252. The primary outlet opening 300h of the extension baffle 300 defines a center axis 305. As indicated by the arrow 307, from an upstream location at the doser axis D to a downstream location at the center axis 305 of the outlet opening 300h of the extension plate 300, there is approximately 390 degrees rotation, which is a significant improvement over the amount of rotation shown in FIG. 18A. FIG. 18C provides for even more rotation as indicated by the arrow 309, where from an upstream location at the doser axis D to a downstream location at the center axis 305 of the outlet opening 300*h* of the extension plate 300', there is approximately 480 degrees rotation.

Figure 19A:
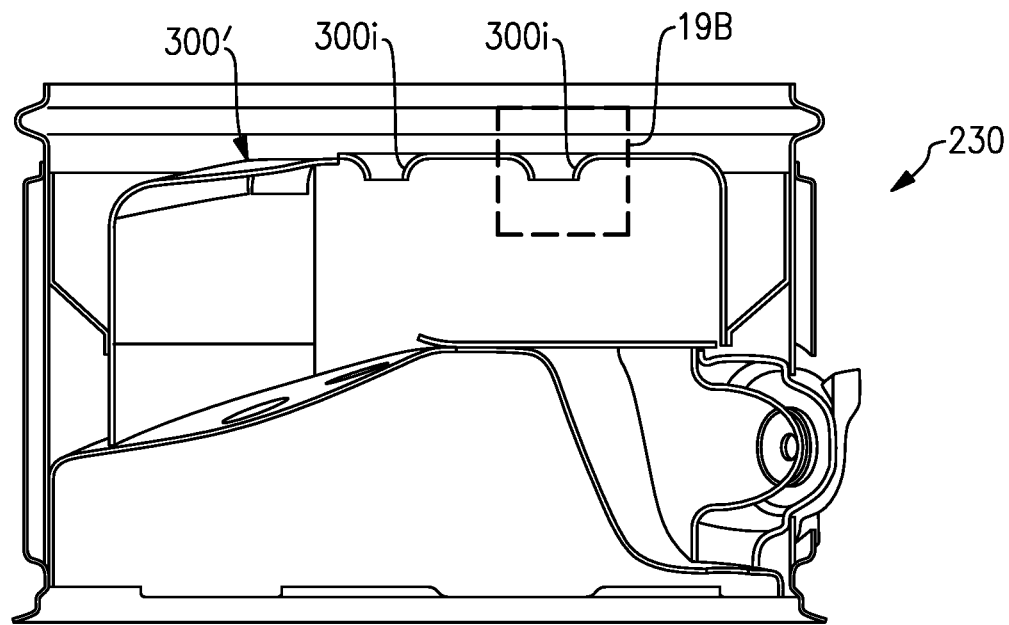
FIG. 19A is a section view taken along the line 19A-19A as indicated in FIG. 17C.
Figure 19B:
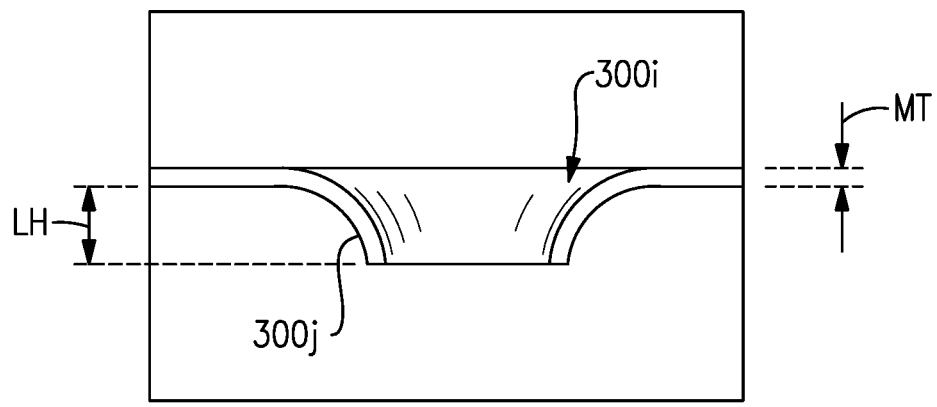
FIG. 19B is a magnified view of the area identified in FIG. 19A.

FIG. 19A is a section view taken as indicated by line 19A in FIG. 17C. This section view is taken through the secondary openings 300*i* in the extension baffle 300' which are each surrounded by a lip 300*j*. The lips 300*j* completely surround each opening 300*i* and extend in an upstream direction. As shown in the magnified view of FIG. 19B, each lip 300*j* has a lip height LH that extends outwardly from the base 300*a* to a distal end of the lip 300*j*. The extension baffle 300 has a material thickness MT. In the example shown, the lip height LH is at least three times the material thickness MT. This relationship results in improved performance compared to prior configurations with shorter lips or no lips. It should be understood that the lip configuration for the extension baffle 300' as shown in FIG. 17C could also be used for the lips 300*j* in the extension baffle 300. Further, the relationship of the lip height being three times the material thickness is also an option used for the lips 268 in the secondary openings 262, 266 for the upstream 250 and downstream 252 baffles. In one example, the lips 300*j* extend to completely surround the respective opening.

Figure 20A:
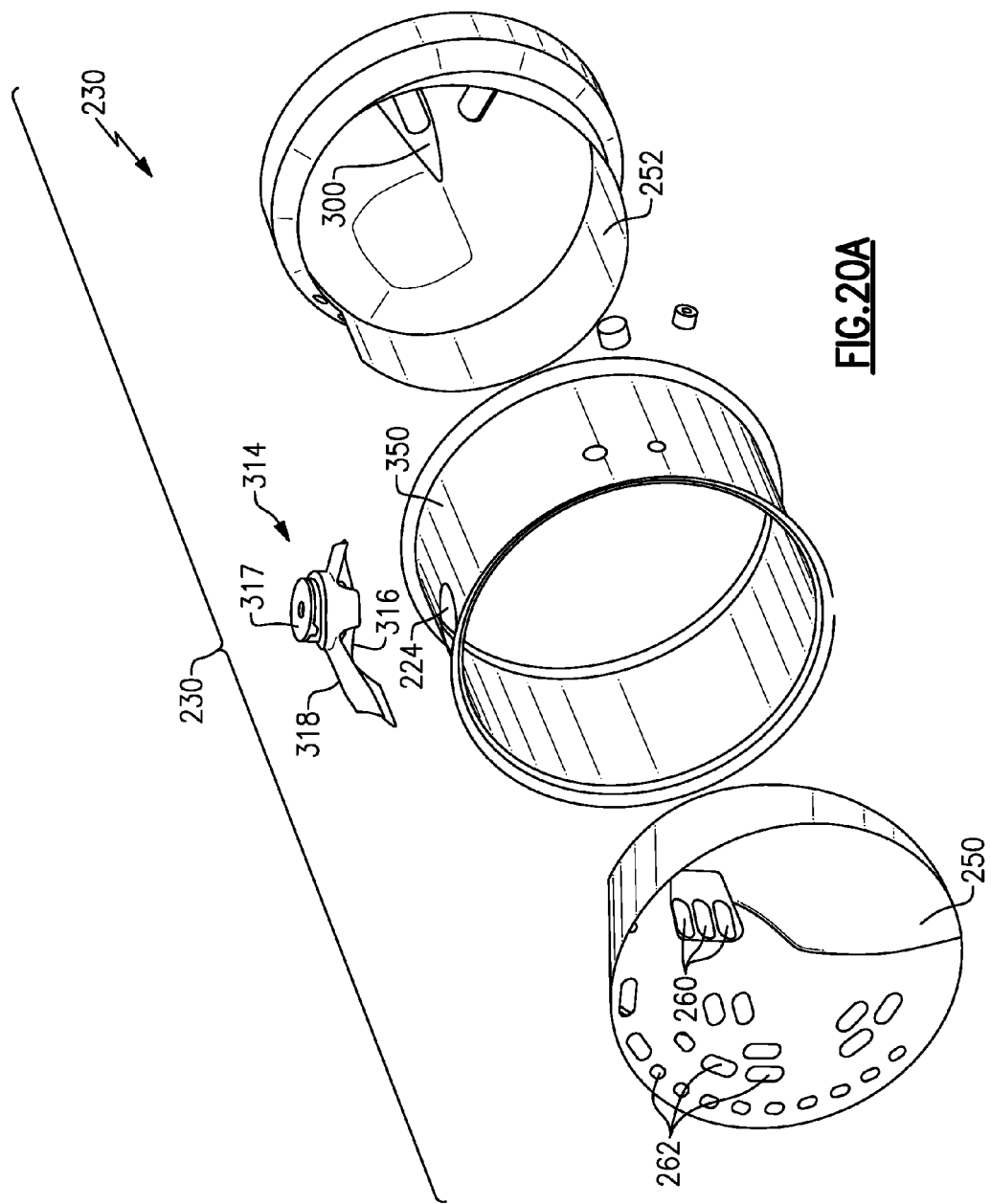
FIG. 20A is an exploded view of the mixer of FIG. 12.
Figure 20B:
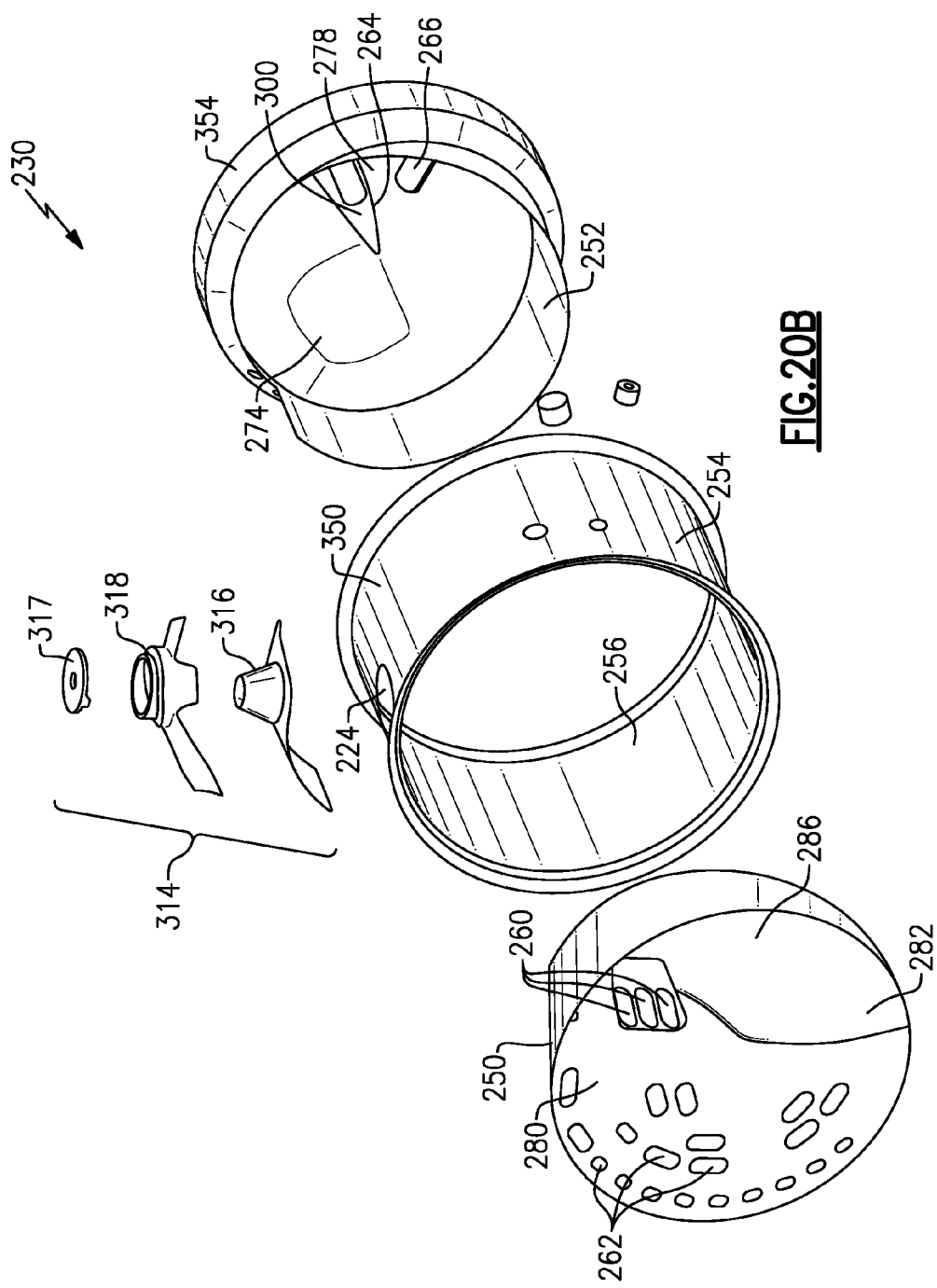
FIG. 20B is an exploded view of a sub-assembly and components as shown in FIG. 20A.
Figure 20C:
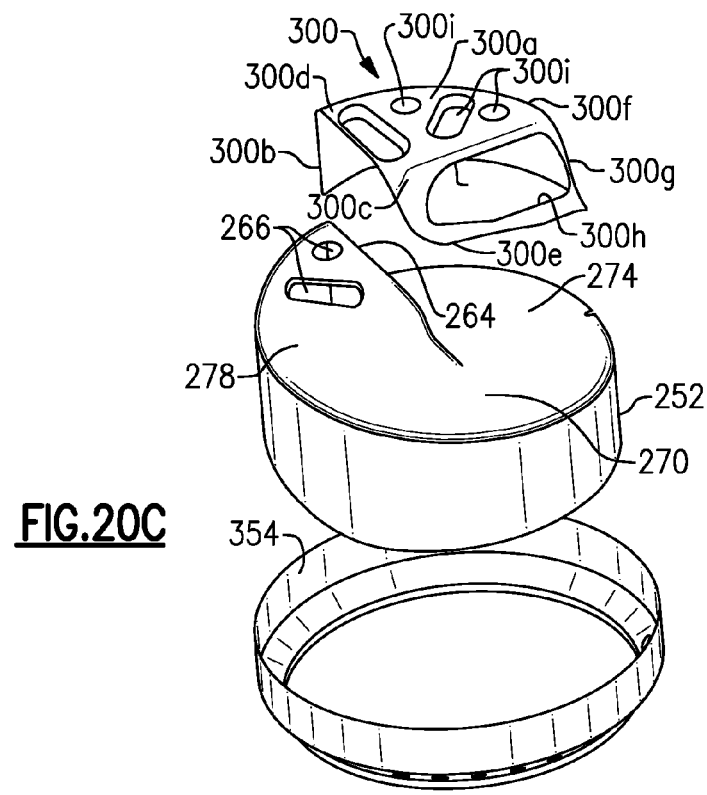
FIG. 20C is an exploded view from an outlet side of an extension baffle, downstream baffle, and mounting ring from FIG. 20A.
Figure 20D:
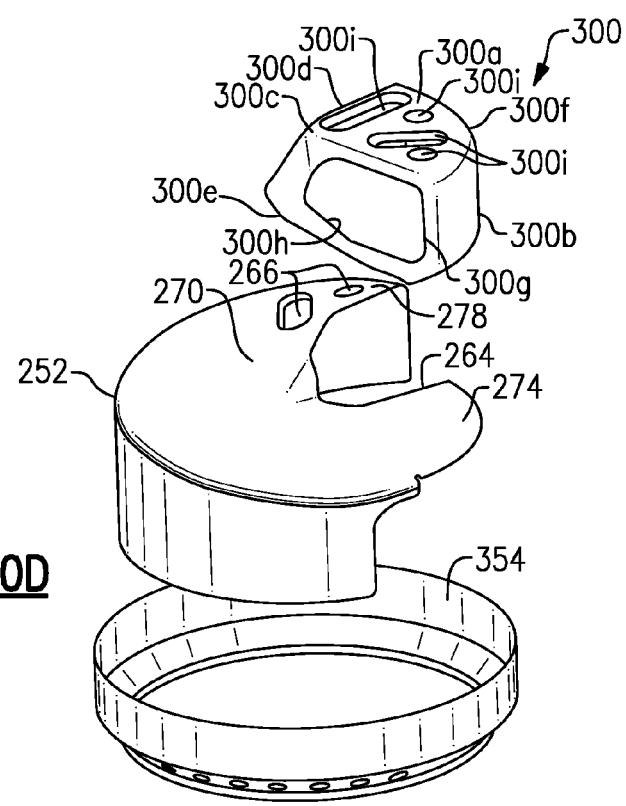
FIG. 20D is an exploded view from an outlet side of an extension baffle, downstream baffle, and mounting ring from FIG. 20C.

FIGS. 20A-D show exploded views of the mixer 230 that correspond to the configuration shown in FIGS. 12 and 17B. The upstream baffle 250 and the downstream baffle 252 are mounted to a ring-shaped structure 350 which includes the doser opening 224. The sub-assembly 314 of the cone plate 316 and manifold 318 is associated with the doser opening 224. FIG. 20B shows an exploded view of the sub-assembly 314. A mounting plate 317 for the doser 36 is attached to the manifold 318 and cone plate 316 assembly. FIGS. 20C-D show an exploded view of the downstream baffle 252 and extension baffle 300. An additional mounting ring 354 can be used to second these components to the rest of the assembly as shown in FIGS. 20A-B.

The subject invention provides a compact mixer that allows 300 up to 480 or greater degrees of flow rotation in order to increase mixing performance and DEF transformation. Further, as discussed above, this improved performance is provided without increasing the axial length of the mixer and, further, does not adversely affect back pressure. For example, this significant amount of rotation is provided within a mixer having an overall length that is between 7 and 10 inches.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mixer for use with a vehicle exhaust system, the mixer comprising an annular side wall that extends circumferentially around and axially along a central axis of the mixer to define an internal region of the mixer, an upstream baffle including a first upstream flat portion perpendicular to the central axis that extends circumferentially about 180 degrees around the central axis, an upstream helical portion that extends circumferentially about the central axis, and an axially extending inlet wall that extends between and interconnects the first upstream flat portion and the upstream helical portion, the axially extending inlet wall formed to include a primary inlet opening arranged to receive exhaust gases moving into the internal region during use of the mixer in a vehicle exhaust system, wherein the primary inlet opening is radially spaced apart from the central axis to induce swirling motion of the exhaust gases about the central axis during use of the mixer, and a downstream baffle axially spaced apart from the upstream baffle including a first downstream flat portion being generally perpendicular to the central axis, a second downstream flat portion being generally perpendicular to the central axis, and a downstream helical portion that interconnects the first and second downstream flat portions, wherein the second downstream flat portion is spaced apart axially from the first downstream flat portion and a primary outlet opening of the downstream baffle is located therebetween.

2. The mixer of claim 1, further comprising an extension baffle including a flat extension plate that is generally perpendicular to the central axis, a circumferential wall that extends axially away from the flat extension plate toward the upstream baffle and circumferentially partway about the central axis, and an axially extending side wall coupled to the flat extension plate and the circumferential wall and the extension baffle is formed to include a primary extension inlet opening aligned with the primary outlet opening of the downstream baffle and a primary extension outlet opening adapted to discharge the exhaust gases during use of the mixer.

3. The mixer of claim 2, wherein the downstream baffle, the flat extension plate, the circumferential wall, and the axially extending side wall of the extension baffle cooperate to define the primary extension inlet opening and the axially extending side wall is formed to include the primary extension outlet opening.

4. The mixer of claim 2, wherein the flat extension plate defines an apex and includes a first edge that extends radially outward away from the apex toward the annular side wall and a second edge that extends radially outward from the apex toward the annular side wall and the second edge is circumferentially spaced apart from the first edge by between about 90 degrees and about 180 degrees relative to the central axis.

5. The mixer of claim 2, wherein the flat extension plate is formed to define a secondary opening that extends axially through the flat extension plate and a lip that protrudes axially toward the upstream baffle and the lip is arranged around the secondary opening.

6. The mixer of claim 5, wherein the flat extension plate has a plate thickness measured axially relative to the central axis, the lip has a lip height measured axially relative to the central axis, and the lip height is about three times larger than the plate thickness.

7. The mixer of claim 1, wherein the at least one primary inlet opening is circumferentially spaced apart from the primary outlet opening of the downstream baffle by about 300 degrees.

8. The mixer of claim 1, wherein the first downstream flat portion, the second downstream flat portion, and the downstream helical portion cooperate to define a first side of the downstream baffle that extends at least 180 degrees circumferentially about the central axis and a second side of the downstream baffle that extends 180 degrees or less about the central axis, the first side of the downstream baffle is free of openings, and the second side of the downstream baffle is formed to include a secondary outlet opening that extends axially through the downstream baffle.

9. The mixer of claim 8, wherein the first upstream flat portion of the upstream baffle is formed to include a plurality of secondary inlet openings that extend axially through the first upstream flat portion of the upstream baffle and the plurality of secondary inlet openings are spaced apart circumferentially and radially from one another.

10. The mixer of claim 1, wherein the first upstream flat portion is formed to include a plurality of secondary inlet openings that are spaced apart circumferentially from one another and aligned circumferentially relative to one another.

11. The mixer of claim 1, wherein the annular side wall is formed to include a doser aperture, the mixer further includes a manifold aligned with the doser aperture, the manifold is arranged to direct fluid into the internal region along a doser axis during use of the mixer, and the doser axis is spaced apart circumferentially from the primary outlet opening of the downstream baffle by about 60 degrees.

12. A mixer comprising
a side wall that extends circumferentially around and axially along a central axis of the mixer to define an internal region of the mixer,
an upstream baffle including an upstream helical portion that extends circumferentially about and axially along the central axis and an axially extending inlet wall formed to include at least one primary inlet opening,
a downstream baffle axially spaced apart from the upstream baffle and including a first downstream flat portion, a second downstream flat portion, and a downstream helical portion that extends circumferentially about the central axis and interconnects the first and second downstream flat portions and the downstream baffle formed to define a primary outlet opening of the downstream baffle located axially between the first downstream flat portion and the second downstream flat portion, and
an extension baffle including a flat extension plate, a circumferential wall that extends axially away from the flat extension plate toward the upstream baffle and circumferentially partway about the central axis, and an axially extending side wall coupled to the flat extension plate and the circumferential wall, wherein the downstream baffle, the flat extension plate, the circumferential wall, and the axially extending side wall of the extension baffle cooperate to define a primary extension inlet opening aligned with the primary outlet opening of the downstream baffle, and the axially extending side wall of the extension baffle is formed to include a primary extension outlet opening.

13. The mixer of claim 12, wherein the upstream baffle further includes a first upstream flat portion that is generally perpendicular to the central axis and a second upstream flat portion that is generally perpendicular to the central axis, the second upstream flat portion is spaced apart axially from the first upstream flat portion, and the first upstream flat portion extends circumferentially about 180 degrees around the central axis.

14. The mixer of claim 13, wherein the first upstream flat portion is formed to include a plurality of secondary inlet openings that are spaced apart circumferentially from one another and aligned circumferentially relative to one another.

15. The mixer of claim 12, wherein the at least one primary inlet opening is radially spaced apart from the central axis.

16. The mixer of claim 15, wherein the first upstream flat portion of the upstream baffle is formed to include a plurality of secondary inlet openings that extend axially through the first upstream flat portion of the upstream baffle and the upstream helical portion is formed without openings.

17. The mixer of claim 16, wherein the at least one primary inlet opening includes a first primary inlet opening and a second primary inlet opening radially spaced apart from the first primary inlet opening.

18. The mixer of claim 12, wherein the flat extension plate defines an apex and includes a first edge that extends radially outward away from the apex and a second edge that extends radially outward from the apex and the second edge is circumferentially spaced apart from the first edge by between about 90 degrees and about 180 degrees relative to the central axis.

19. The mixer of claim 12, wherein the first downstream flat portion, the second downstream flat portion, and the downstream helical portion cooperate to define a first side of the downstream baffle that extends at least 180 degrees circumferentially about the central axis and a second side of the downstream baffle that extends 180 degrees or less about the central axis, the first side of the downstream baffle is free of openings, and the second side of the downstream baffle is formed to include a secondary outlet opening that extends axially through the downstream baffle.

20. The mixer of claim 12, wherein the downstream baffle is formed to include at least one secondary outlet opening that extends axially through the downstream baffle and the flat extension plate is formed to include at least one secondary extension opening that extends axially through the flat extension plate.

21. The mixer of claim 12, wherein the side wall is formed to include a doser aperture, the mixer further includes a manifold aligned with the doser aperture, the manifold is arranged to direct fluid into the internal region along a doser axis during use of the mixer, and the doser axis is spaced apart circumferentially from the primary outlet opening of the downstream baffle by about 60 degrees.

* * * * *